United States Patent
Narita et al.

(10) Patent No.: US 12,138,555 B2
(45) Date of Patent: Nov. 12, 2024

(54) DISTRIBUTION SYSTEM, DISTRIBUTION SYSTEM CONTROLLING METHOD, AND COMPUTER PROGRAM

(71) Applicant: Konami Digital Entertainment Co., Ltd., Tokyo (JP)

(72) Inventors: Yoshihiko Narita, Tokyo (JP); Shigeru Chiba, Tokyo (JP); Akira Sakai, Tokyo (JP); Kai Inoue, Tokyo (JP); Tsuguo Shinpo, Tokyo (JP); Toshiaki Kanahara, Tokyo (JP); Junki Hirai, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 8 days.

(21) Appl. No.: 17/993,261

(22) Filed: Nov. 23, 2022

(65) Prior Publication Data

US 2023/0079509 A1 Mar. 16, 2023

Related U.S. Application Data

(63) Continuation of application No. PCT/JP2021/017941, filed on May 11, 2021.

(30) Foreign Application Priority Data

May 29, 2020 (JP) ................................. 2020-094772
Sep. 4, 2020 (JP) ................................. 2020-149201

(51) Int. Cl.
*A63F 13/86* (2014.01)
*H04N 21/258* (2011.01)
*H04N 21/2668* (2011.01)

(52) U.S. Cl.
CPC ........... *A63F 13/86* (2014.09); *H04N 21/258* (2013.01); *H04N 21/2668* (2013.01)

(58) Field of Classification Search
CPC ........ A63F 13/86; A63F 13/30; A63F 13/533; A63F 13/655; A63F 13/79; A63F 13/87;
(Continued)

(56) References Cited

U.S. PATENT DOCUMENTS 9,092,928 B2 *  7/2015  Cohen ............... G06F 17/30056
2001/0035814 A1 * 11/2001  Uchida .................... H04Q 1/00
(Continued)

FOREIGN PATENT DOCUMENTS

CN   105872830 A   8/2016
CN   108419140 A   8/2018
(Continued)

OTHER PUBLICATIONS

Communication dated Dec. 25, 2020 from the Japanese Patent Office in Application No. 2020-149201.
(Continued)

*Primary Examiner* — Anthony Bantamoi
(74) *Attorney, Agent, or Firm* — Sughrue Mion, PLLC

(57) ABSTRACT

A distribution system distributes a viewing video to a user terminal of each of plural users who are viewers, the distribution system having a computer receiving a user operation inputted from each user terminal, the computer selecting one or more pieces of distribution data from a distribution data group including plural pieces of distribution data in response to the user operation, and the computer distributing the distribution data selected by the computer to the user terminal from which the user operation has been inputted.

20 Claims, 7 Drawing Sheets

(58) Field of Classification Search
CPC .............. A63F 13/69; H04N 21/258; H04N 21/2668; H04N 21/4781; G06F 13/00
See application file for complete search history.

(56) References Cited

U.S. PATENT DOCUMENTS

| | | | |
|---|---|---|---|
| 2002/0087975 A1* | 7/2002 | Schlack | ............... H04N 7/05 |
| 2014/0053175 A1* | 2/2014 | Ito | ............... H04N 21/482 |
| 2015/0186947 A1* | 7/2015 | Huang | |
| 2019/0099678 A1 | 4/2019 | Khan et al. | |
| 2020/0084428 A1* | 3/2020 | Oh | ............... H04N 13/194 |
| 2022/0083126 A1 | 3/2022 | Iwaki | |

FOREIGN PATENT DOCUMENTS

| | | | | |
|---|---|---|---|---|
| EP | 1431859 A2 * | 6/2004 | ............ | G06F 21/10 |
| JP | 2011-77965 A | 4/2011 | | |
| JP | 2012-90120 A | 5/2012 | | |
| JP | 2014-176424 A | 9/2014 | | |
| JP | 2016-189804 A | 11/2016 | | |
| JP | 2017-220763 A | 12/2017 | | |
| JP | 6543403 B1 | 7/2019 | | |
| JP | 2019-165490 A | 9/2019 | | |
| JP | 2020-17146 A | 1/2020 | | |
| JP | 2020-17870 A | 1/2020 | | |
| JP | 6644928 B1 | 2/2020 | | |
| JP | 2020-57292 A | 4/2020 | | |
| JP | 2020-166575 A | 10/2020 | | |
| JP | 2021-168748 A | 10/2021 | | |

OTHER PUBLICATIONS

Communication dated May 28, 2021 from the Japanese Patent Office in Application No. 2020-149201.
Communication dated Sep. 15, 2021 from the Japanese Patent Office in Application No. 2020-149201.
Communication dated Jan. 6, 2022 from the Japanese Patent Office in Application No. 2020-149201.
International Search Report dated Jul. 20, 2021 in Application No. PCT/JP2021/017941.
Written Opinion of the International Searching Authority dated Jul. 20, 2021 in Application No. PCT/JP2021/017941.
Regarding "Social tipping" digital goods of TwitCasting, TwitCasting streaming program of Bamgia, retrieved online, Apr. 9, 2020, URL: https://bamgia.localinfo.jp/posts/8049725, 6 pages total.
Office Action issued Aug. 14, 2024 in Korean Application No. 10-2022-7040814.

* cited by examiner

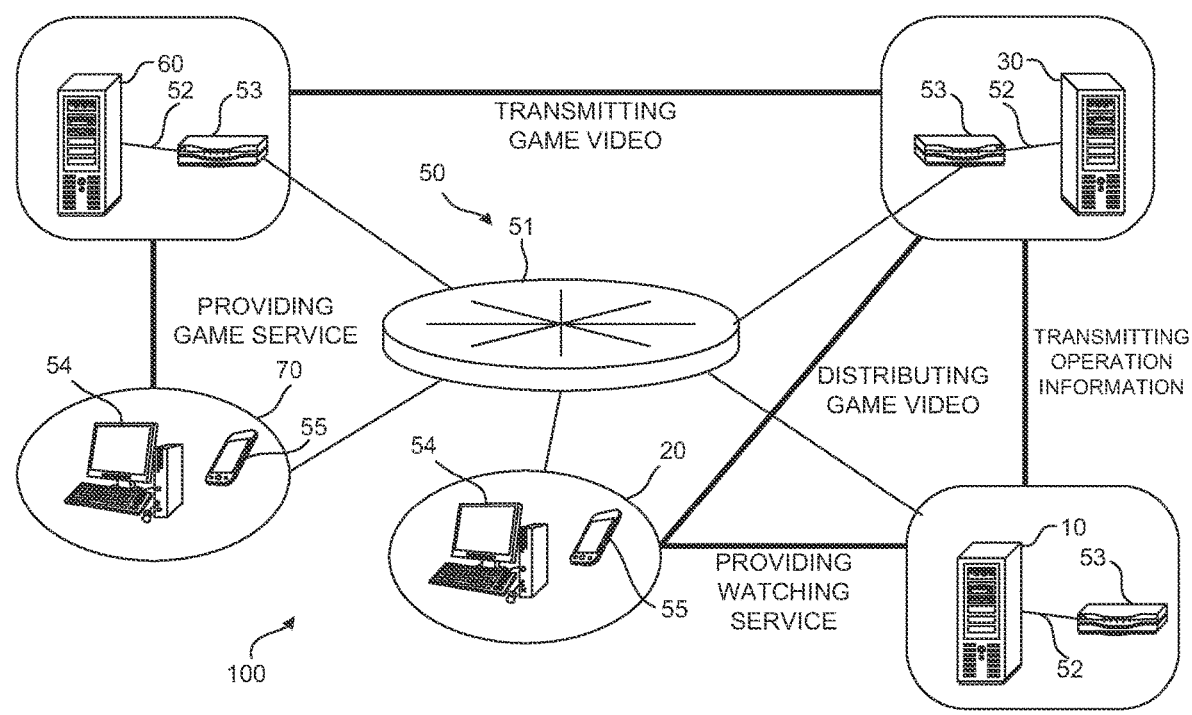

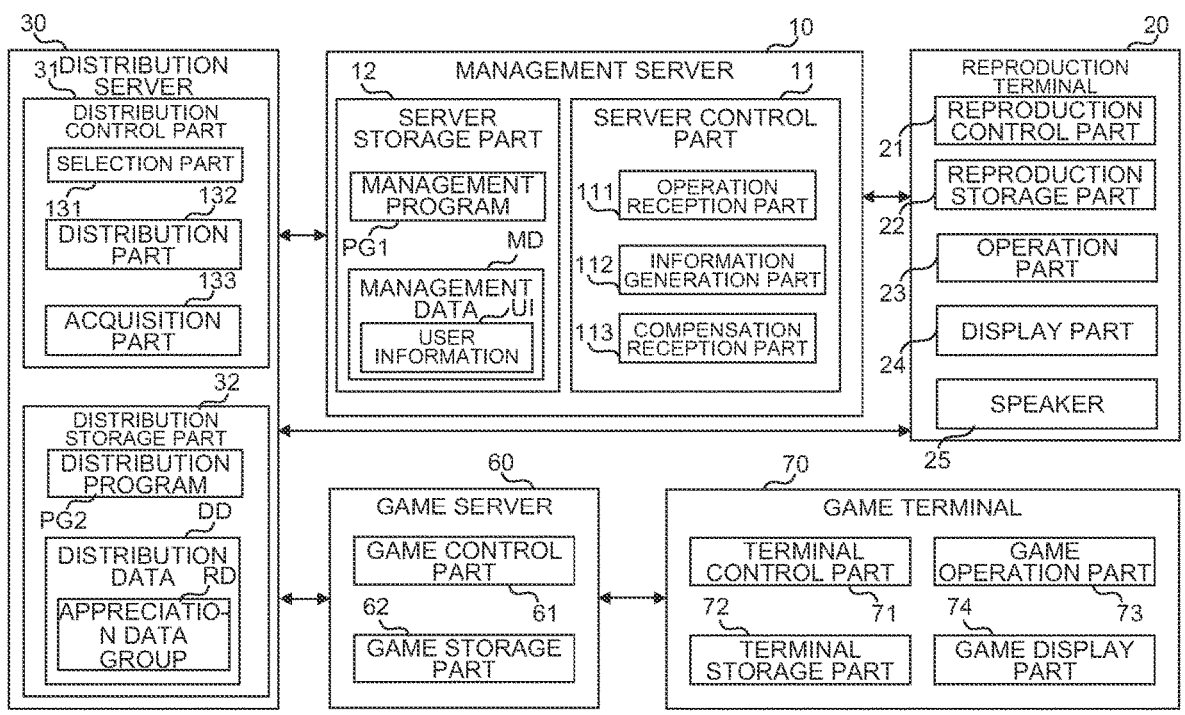

[FIG. 3]
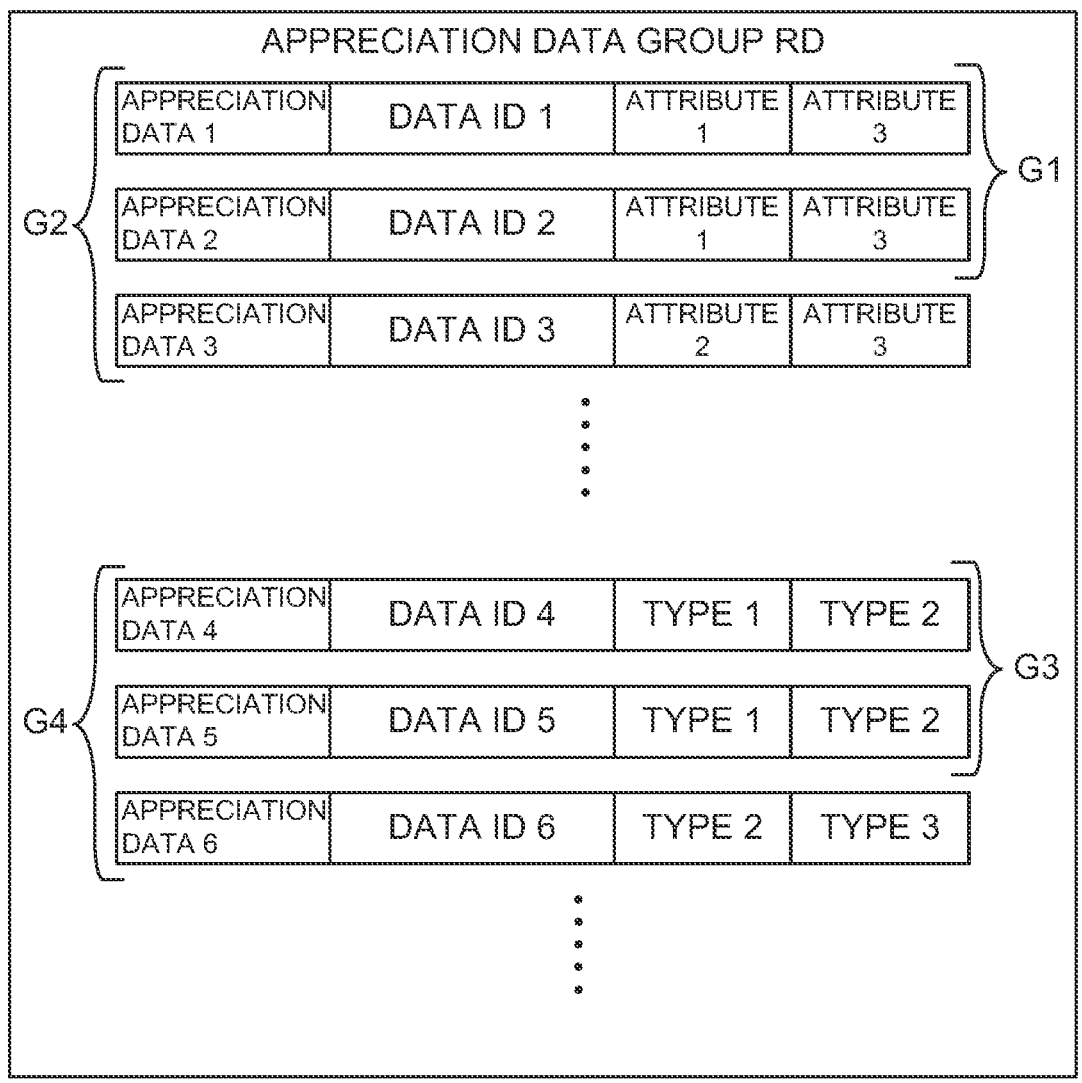

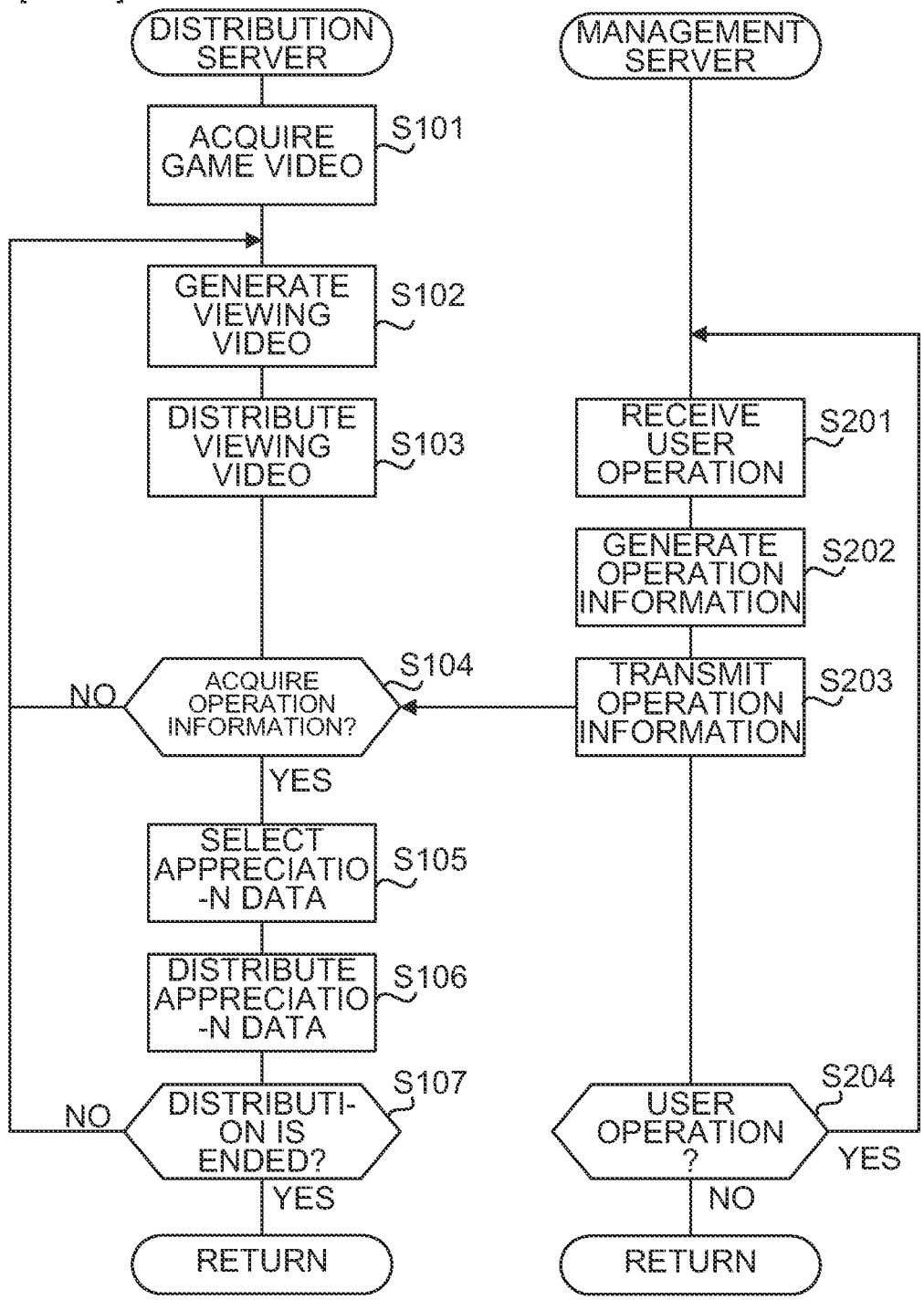

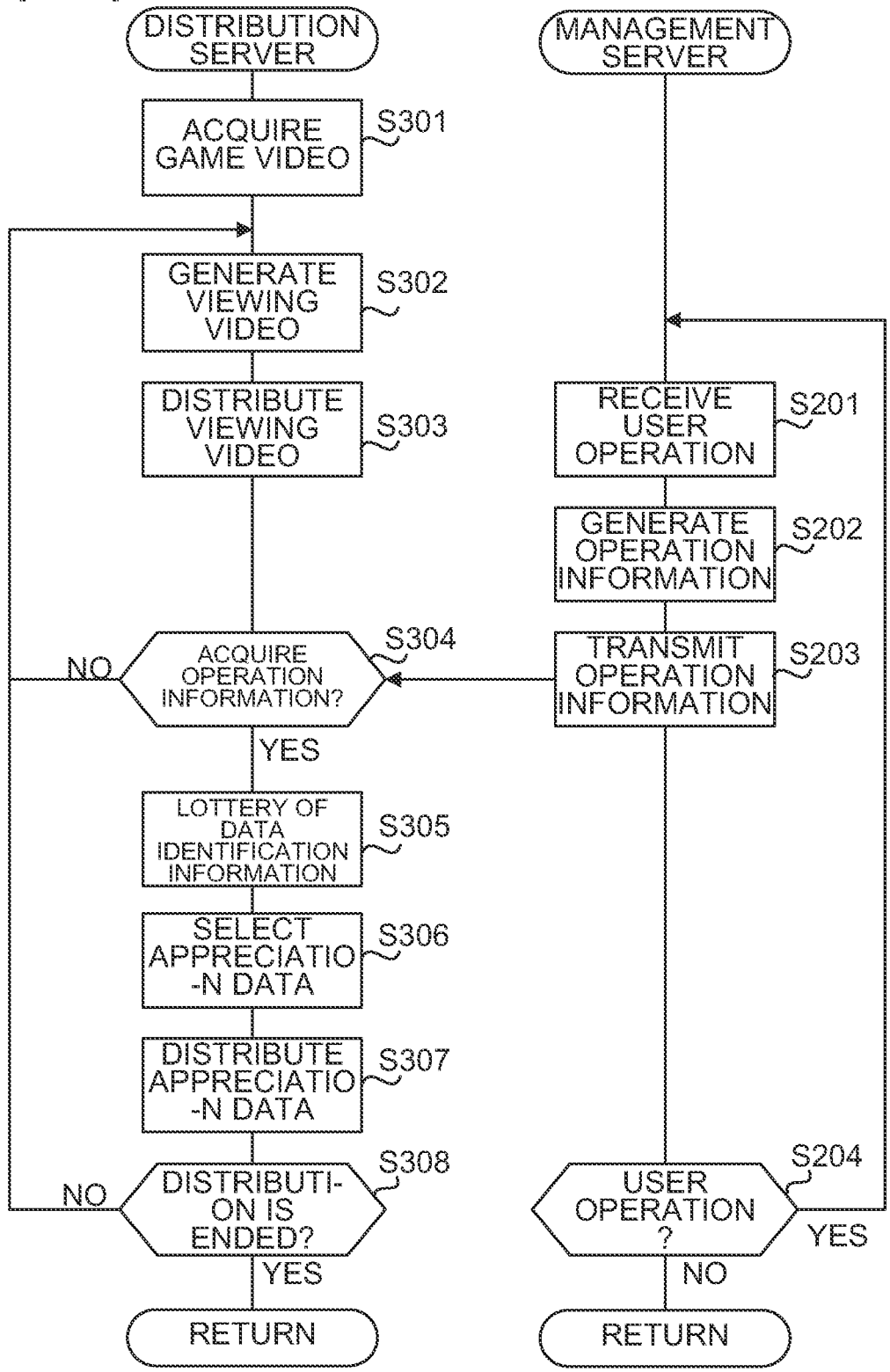

[FIG. 6]
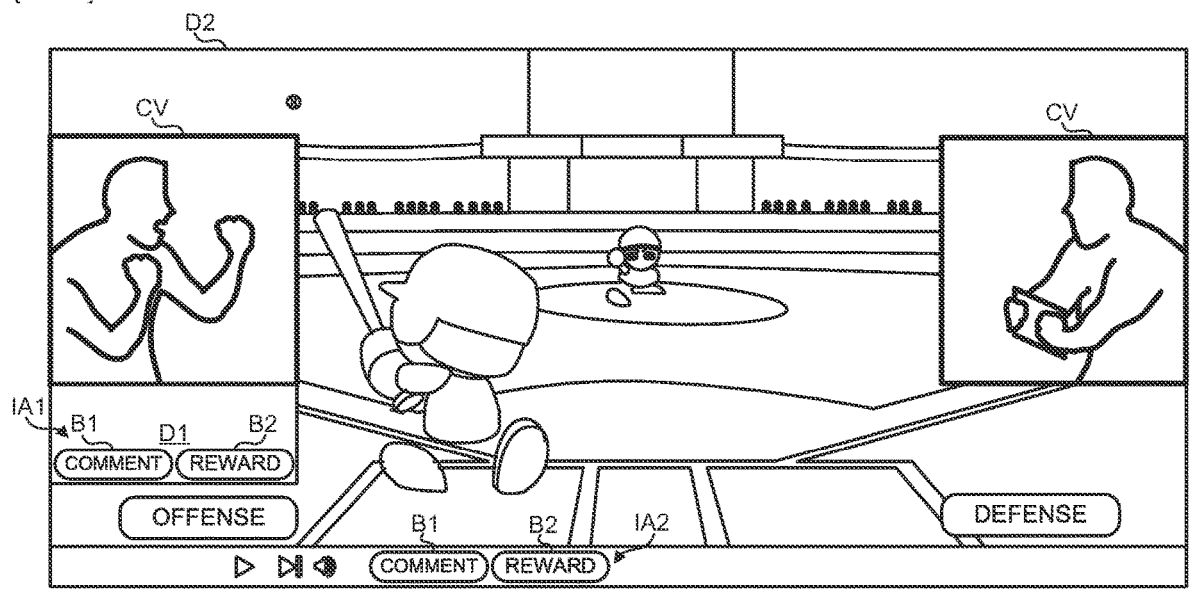

[FIG. 7]
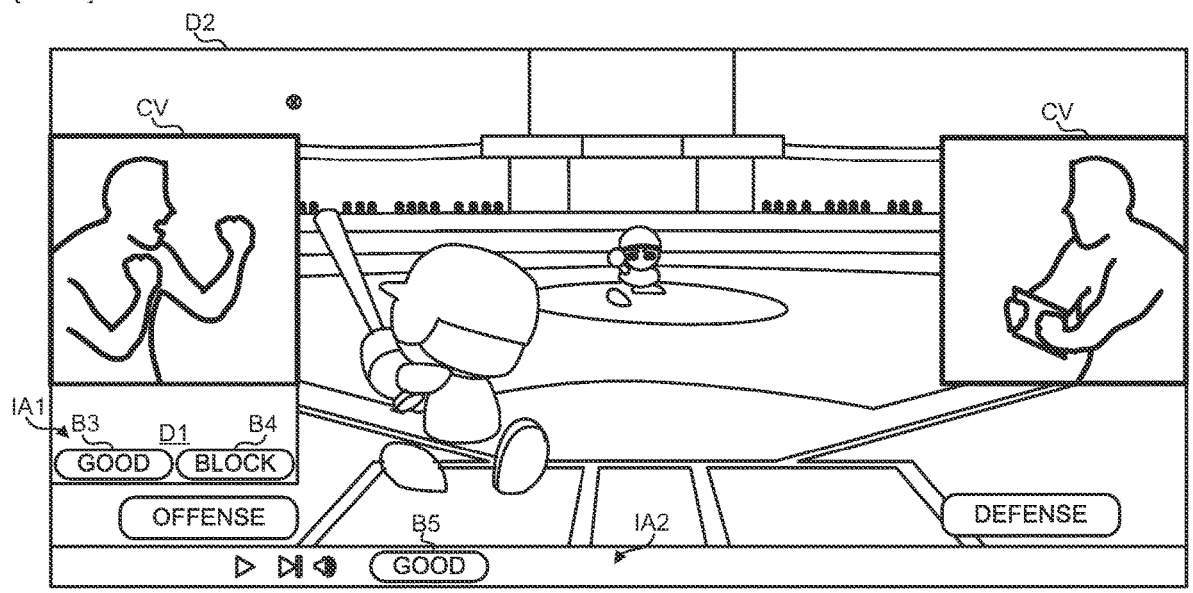

DISTRIBUTION SYSTEM, DISTRIBUTION SYSTEM CONTROLLING METHOD, AND COMPUTER PROGRAM

CROSS REFERENCE TO RELATED APPLICATIONS

This application is a continuation of PCT/JP2021/017941 filed on May 11, 2021, which is based on and claims priority to Japanese Patent Application No. 2020-094772, filed with the Japanese Patent Office on May 29, 2020 and Japanese Patent Application No. 2020-149201, filed with the Japanese Patent Office on Sep. 4, 2020, the contents of each of which are incorporated by reference herein in their entireties.

BACKGROUND OF THE INVENTION

Field of the Invention

The present disclosure relates to a distribution system that distributes distribution data in response to user operations, a distribution system controlling method, and a computer program.

Description of the Related Art

Patent Literature 1 discloses a configuration in which a video posting and viewing app includes a tip effect function that receives, from a mobile terminal of a viewing user, an instruction for displaying a tip effect image decorating a singing video being distributed, and superimposes the tip effect image onto the singing video. The tip effect function performs the process for superimposing the tip effect image onto the singing video being displayed on the screen of the mobile terminal used by the viewing user after an operation icon displayed on the screen is clicked. The singing video with the superimposed effect is stored in a server and distributed so as to be viewing via a video posting site by not only the viewing user who provided the tip input, but also other viewing users.

Patent Literature 2 discloses a configuration in which a gift request processing part in a video distribution system receives, from a viewing user, a request for displaying a specific wearable object. On the basis of the display request, a display instruction object is displayed on a display screen of a distributing user device. When the display instruction object is selected, the gift request processing part causes the wearable object corresponding to the selected display instruction object to be displayed in a video being distributed. Patent Literature 2 also discloses a configuration in which, when a wearable gift is gifted in the case of a joint-appearance video, the viewing user can designate which distributing user appearing in the joint-appearance video is to be gifted.

Patent Literature 3 discloses a configuration in which a drop-in execution part of a drop-in control server in a live video broadcast system receives, from a reception part, a request for dropping an item into a live broadcast video, and drops the item indicated by the request into the video in exchange for compensation. Also, the drop-in execution part issues an item drop-in request. Furthermore, a live broadcast server receiving the item drop-in request performs processing for superimposing an item image or the like onto the live broadcast video, and distributes the processed video to a distributor terminal and a spectator terminal.

Patent Literature 4 discloses a configuration in which a game system is provided with a message content control function whereby a message candidate is selected automatically according to the state of a user's game and transmitted to a destination designated by the user. The destination is a specific user, a user acting as an opponent, a user registered as a friend, or the like, and the users can be designated as appropriate. Also, the message candidate can be set according to the type of game state, such as a record of the user's wins and losses, the state of a battle in progress, the relationship with the opponent, the time of day or the day of the week when the user is playing the game, or the state of the weather during gameplay, for example.

CITATION LIST

Patent Literature

Patent Literature 1: JP2020-017870A
Patent Literature 2: JP6543403B
Patent Literature 3: JP2020-017146A
Patent Literature 4: JP2014-176424A

SUMMARY OF THE INVENTION

In Patent Literatures 1 to 3, if a user viewing a video performs an operation, an image or video is displayed as a reaction to the operation. The operation is a tipping, a gift request, and an item request, for example. Moreover, in Patent Literature 4, a message is transmitted according to the game state. The image or the like displayed according to the reactions may serve as an appreciation with respect to the operation. However, if the displayed image or the like is a fixed reaction, it is difficult to elicit interest in the users who are the viewers, and it is difficult to adequately satisfy the users by the appreciation.

A distribution system according to an aspect of the present disclosure is a distribution system that distributes a viewing video to a user terminal of each of a plurality of users who are viewers, the distribution system comprising: an operation reception unit receiving a user operation inputted from each user terminal; a selection unit selecting at least one piece of distribution data from a distribution data group including a plurality of pieces of distribution data in response to the user operation; and a data distribution unit distributing the distribution data selected by the selection unit to at least the user terminal from which the user operation has been inputted.

Also, a control method according to an aspect of the present disclosure is a control method of a distribution system that distributes a viewing video to a user terminal of each of a plurality of users who are viewers, the control method comprising: receiving a user operation inputted from each user terminal; selecting at least one piece of distribution data from a distribution data group including a plurality of pieces of distribution data in response to the user operation; and distributing the selected distribution data to at least the user terminal from which the user operation has been inputted.

Also, a computer program according to an aspect of the present disclosure is a computer program of a distribution system that has a computer and that distributes a viewing video to a user terminal of each of a plurality of users who are viewers, the computer program causing the computer to function as: an operation reception unit receiving a user operation inputted from each user terminal; a selection unit selecting at least one piece of distribution data from a distribution data group including a plurality of pieces of distribution data in response to the user operation; and a data distribution unit distributing the distribution data selected by the selection unit to at least the user terminal from which the user operation has been inputted.

A distribution system according to another aspect of the present disclosure is a distribution system that distributes a viewing video to a user terminal of each of a plurality of users who are viewers, the distribution system comprising: a game device; a video distribution unit generating the viewing video from a game video of a game provided by the game device and distributing the viewing video to each user terminal; an operation reception unit receiving a user operation inputted from each user terminal; a selection unit selecting at least one piece of distribution data from a distribution data group including a plurality of pieces of distribution data in response to the user operation; and a data distribution unit distributing the distribution data selected by the selection unit to at least the user terminal from which the user operation has been inputted.

Accordingly, distribution data selected from among a plurality of pieces of distribution data can be distributed in response to an operation by a user who views a viewing video, and user satisfaction can be increased.

BRIEF DESCRIPTION OF THE DRAWINGS

FIG. 1 is a schematic overview of a distribution system.

FIG. 2 is a schematic block diagram of a distribution system.

FIG. 3 is a schematic explanatory diagram of an appreciation data group.

FIG. 4 is a flowchart of the distribution of appreciation data according to a first embodiment.

FIG. 5 is a flowchart of the distribution of appreciation data according to a second embodiment.

FIG. 6 is an example of a viewing video according to a first example in a fourth embodiment.

FIG. 7 is an example of a viewing video according to a second example in the fourth embodiment.

DESCRIPTION OF THE EMBODIMENTS

Hereinafter, exemplary embodiments for carrying out the present disclosure will be described in detail and with reference to the drawings. However, the dimensions, materials, shapes, and relative positions of components described in the following embodiments can be set freely, and can be modified according to the configuration of a device to which the present disclosure is applied or various conditions. Furthermore, unless indicated otherwise, the scope of the present disclosure is not limited to the embodiments described specifically hereinafter.

First Embodiment

As illustrated in FIG. 1, a distribution system 100 that distributes a viewing video to the user terminal of each of a plurality of users who are viewers (hereinafter also referred to as viewing users) is provided with a management server 10 that manages user operations by the users. The distribution system 100 is also provided with a reproduction terminal 20 which is one example of a user terminal, a distribution server 30 that distributes the viewing video, a game server 60, and a game terminal 70 as one example of a game device. The reproduction terminal 20 is connectible to the management server 10 and the distribution server 30 over a prescribed network 50. As an example, the viewing user uses the reproduction terminal 20 at the venue of a game competition, at the home of the viewing user, or the like. Additionally, the game terminal 70 is connectible to the game server 60 over the prescribed network 50. As an example, a player of a game uses the game terminal 70 at the venue of a game competition or in a prescribed facility such as a shop.

The management server 10, the distribution server 30, and the game server 60 are configured as a single logical server device by combining server units as a plurality of computers. However, the management server 10, the distribution server 30, and the game server 60 may also be configured by a single server unit. Alternatively, cloud computing may be used to logically configure the management server 10, the distribution server 30, and the game server 60. Incidentally, at least two of the management server 10, the distribution server 30, and the game server 60 may be provided in a single server. For example, the management server 10 may be made to also function as the distribution server 30. Furthermore, the game server 60 may be made to also function as the management server 10 and the distribution server 30.

The management server 10 receives a user operation inputted by a viewing user from the reproduction terminal 20, and generates and transmits operation information to the distribution server 30. The management server 10 stores and manages unique information for each viewing user associated with user identification information (for example, a user ID) that identifies each viewing user. As an example, the operation information is information related to the user operation, such as user identification information, terminal identification information that identifies each reproduction terminal 20, input information such as the content of an inputted comment, and operation identification information that identifies the type of user operation. A viewing user of the viewing video can use the reproduction terminal 20 to input a user operation. For example, a viewing user can input, into a comment input field displayed on the reproduction terminal 20, a user operation for posting a cheering comment to a player. Moreover, by performing a touch operation on a reward icon displayed on the reproduction terminal 20, a viewing user can input a user operation for providing or contributing a reward to a player or the like. The management server 10 receiving the user operation generates, and transmits to the distribution server 30, operation information in which user identification information, operation identification information, input information, and the like are associated. Incidentally, the cheer target who is provided with the posted comment or the provided or contributed a reward by a viewing user is not limited to the distributor who uploads a video and the like. For example, besides the distributor, the cheer target may also include a performer, a group with which the distributor or the performer is affiliated, or the like. In some cases, the distributor may not be a cheer target, such as when the distributor is simply a staff member or the like.

The distribution server 30 provides a distribution service enabling the reproduction terminal 20 or a viewing user in possession of the reproduction terminal 20 to view a viewing video. For example, the distribution server 30 acquires a game video from the game server 60, and generates and distributes a viewing video to the reproduction terminal 20. The distribution server 30 also saves distribution data such as images or videos for use as an appreciation. Additionally, the distribution server 30 selects distribution data on the basis of operation information and generates viewing video with the distribution data superimposed onto the game video.

In addition, the distribution service includes a distribution service that distributes and updates programs or data for the reproduction terminal 20 over the network 50. Through the distribution service, the distribution server 30 appropriately distributes various programs or data necessary for viewing the viewing video to each reproduction terminal 20. As an example, the viewing video to be distributed includes video for viewing a game video or the like, a distribution screen for performing operations, and distribution data. Also, the game video includes a game video of a game being played on the game terminal 70, a game video created by capturing a game screen or the like, and game-related video such as a video capturing the player of the game, a spectator watching the game, and the like. The video included in the viewing video may be any video distributed by the distributor, and may include video created by the distributor him- or herself, other video such as a movie, drama, anime, and variety program, and input information such as comments or images posted by viewing users. Hereinafter, an example in which the viewing video includes a game video will be described.

For example, the distribution server 30 provides a web service to the user of the reproduction terminal 20 over the network 50. In the web service, in the case where the distribution server 30 provides the distribution service, a viewing video to be reproduced on the reproduction terminal 20 is distributed. Besides, the web service may include other services, such as an information providing service that provides various information related to viewing videos, a community service that provides a place of exchange by transmitting, trading, and sharing information produced by viewing users, and a service that assigns user identification information for identifying each viewing user.

The distribution server 30 also distributes a game video generated by the game server 60. Alternatively, the distribution server 30 may distribute a video received from a device other than the game server 60. As an example, the distribution server 30 may distribute a game video created by the player of the game or another distributor. In this case, the distribution server 30 distributes the game video uploaded by the player or the other distributor to the reproduction terminal 20.

The game server 60 provides various services for game devices to the game terminal 70 or the user of the game terminal 70. The services include a distribution service that distributes and updates programs or data for the game terminal 70 over the network 50. Through the distribution service, the game server 60 appropriately distributes various programs or data necessary for providing game services to each game terminal 70.

As an example, the game server 60 provides services for sports games. For example, the game server 60 provides services for a baseball game as a sports game that includes a training part for training baseball players and a competitive part in which a team to which the trained baseball players belong competes against an opposing team. Besides, the game server 60 may also provide services for other types of games, such as first-person shooting (FPS) games, third-person shooting (TPS) games, real-time strategy (RTS) games, multiplayer online battle arena (MOBA) games, massively multiplayer online role-playing games (MMORPGs), fighting games, racing games, puzzle games, trading card games, and online strategy games.

The services for game devices provided by the game server 60 may also include a service in which the game server 60 receives player identification information about a player from the game terminal 70 and authenticates the player. The services for game devices may also include a service in which the game server 60 receives and saves play data from the game terminal 70, the play data including a video of the game screen or a result of play by an authenticated player. Furthermore, the services for game devices may also include a service in which the game server 60 provides saved play data to the game terminal 70. Otherwise, the services for game devices may include a service in which, when a plurality of players play a common game over the network 50, the game server 60 matches players to each other. Also, the services for game devices may include a service in which the game server 60 collects a fee from a player.

The network 50 is configured such that the reproduction terminal 20 can be connected to the management server 10 and distribution server 30 and the game terminal 70 can be connected to the game server 60. As an example, the network 50 is configured such that network communication is achieved using the TCP/IP protocol. Specifically, a LAN 52 connects each of the management server 10, the distribution server 30, and the game server 60 to the Internet 51. In addition, the Internet 51, which acts as a WAN, and the LAN 52 are connected via a router 53. The reproduction terminal 20 and the game terminal 70 likewise are configured to be connected to the Internet 51. The management server 10, distribution server 30, and game server 60, and the reproduction terminal 20 and game terminal 70, may also be interconnected through the Internet 51 instead of, or in addition to, the LAN 52. Incidentally, in FIG. 1, the thin lines indicate connections to the Internet 51 while the thick lines indicate provided services, transmitted information, and the like. The thick lines do not necessarily indicate direction communication between devices, but the devices may also be configured to communicate with each other directly.

The reproduction terminal 20 and the game terminal 70 are computer devices with network connectivity. For example, the reproduction terminal 20 and the game terminal 70 include a desktop or notebook personal computer 54 and a mobile terminal device 55 such as a mobile phone (including a smartphone). Otherwise, any of various types of computer devices, such as a stationary home game device, a handheld game device, and a mobile tablet terminal device, are included in the reproduction terminal 20 and the game terminal 70. The reproduction terminal 20 and the game terminal 70 can implement various types of computer software to thereby enable the user to receive various services provided by the management server 10, the distribution server 30, and the game server 60. Specifically, the reproduction terminal 20 functions as a terminal for displaying a viewing video through software for video reproduction. Also, the game terminal 70 functions as a game device through software for game devices. Besides, the reproduction terminal 20 and the game terminal 70 may also be arcade game machines.

As an example, in the distribution system 100, the game server 60 provides a game service to the game terminal 70. In addition, the game server 60 records a game video of the game played on the game terminal 70 or a game video created by capturing the game screen or the like. The game video may also be a game-related video such as a video capturing the player of the game or a spectator watching the game. The game server 60 transmits the acquired or created game video to the distribution server 30. Thereafter, the distribution server 30 distributes the received game video to the reproduction terminal 20.

[Overview of Distribution Service]

In the distribution service of the distribution system 100, when a viewing user performs a user operation for posting a comment or providing or contributing a reward, the distribution server 30 selects a video from among a plurality of pieces of distribution data stored in the distribution server 30, such as a plurality of appreciation videos, for example. Specifically, the distributor (for example, a commentator) who uploaded the game video included in the viewing video uploads a plurality of appreciation videos to the distribution server 30. Thereafter, the distribution server 30 selects an appreciation video from among the plurality of appreciation videos uploaded by the distributor. As an example, the plurality of appreciation videos uploaded by the distributor are saved in association with identification information (for example, a distributor ID) that identifies each distributor. With this arrangement, when a viewing user performs comment posting or the like while the distributor is livestreaming, the distribution server 30 selects an appreciation video from among the plurality of appreciation videos associated with the distributor ID of the distributor. Thereafter, the selected appreciation video is distributed to the viewing user. Incidentally, the plurality of appreciation videos may also include videos uploaded by the administrator or the like or each server. Furthermore, the appreciation videos stored by the distribution server 30 may be associated with identification information (for example, a distribution ID) that identifies the viewing video. In this case, the appreciation video is associated with the distributor ID and also associated with the distribution ID.

Additionally, the appreciation videos stored by the distribution server 30 may also be associated with identification information that identifies a freely created group. As an example, the group may be a company to which the distributor is belonging, a group that includes other distributors, or the like. A single appreciation video created by a plurality of distributors as a group is associated with the distributor IDs of the individual distributors and with identification information (for example, a group ID) that identifies the group. Additionally, in the case where another distributor is livestreaming, the distribution server 30 may select an appreciation video created by the group. In other words, a single appreciation video may be associated with a plurality of types of identification information. Besides, an appreciation video does not necessarily have to be associated with the distributor ID of a distributor. For example, when a performer in a viewing video is different from the distributor, the appreciation video may be associated with identification information that identifies the performer. In this case, when a viewing user performs comment posting or the like specifying the performer as the cheer target, the identification information of the viewing user, information specifying the viewing video, and information specifying the performer who is a posting target of the comment may be transmitted from the reproduction terminal 20 to the management server 10 and used to generate operation information. In the following, distribution data is also referred to as appreciation data. An appreciation video is a video with a short reproduction time compared to a viewing video. Alternatively, the appreciation video may be a video with a longer reproduction time than the viewing video, for example, in the case where the appreciation video and the viewing video are not displayed at the same time. The distribution server 30 distributes the selected appreciation video to the reproduction terminal 20 possessed by the viewing user.

Incidentally, in a typical video distribution service or livestreaming application, a viewing user may be able to input user operations for posting a comment or contributing a reward. When the user operations are inputted, the username of the viewing user who provided the input and the content of the comment or the content of the reward are distributed to the user terminal of the viewing user so as to be included in the viewing video. In the case of a livestream, the distributor, for example the player of the game, can see the viewing video and say thank you or input an appreciation comment in response to the comment or reward. Thereafter, the appreciation is distributed together with the game video and the viewing user views the appreciation. By establishing bidirectional actions in this way, a sense of presence and familiarity can be imparted to the viewing user.

One example of bidirectional actions not being established is the case where many user operations are inputted in a short time. In this case, as a result of the player being unable to acknowledge some of the comments or the like, or the player being unable to respond with an appreciation in time, there may be some viewing users who do not receive an appreciation from the player. Therefore, a viewing user, who performed a user operation and does not receive an appreciation from the player, will feel dissatisfied, and the number of user operations will decrease. On the other hand, there is a limit to the player's ability to acknowledge or respond, and therefore the possibility that bidirectional actions may not be established in some cases cannot be eliminated.

In particular, in the case where a game video of an electronic sports (esports) is livestreamed, the target of the cheer by viewing users is the player playing the game. Furthermore, since a player engaged in competition needs to concentrate on the game, it is difficult to respond with appreciations in response to user operations by viewing users. Moreover, even if it is possible to pause the game to respond with appreciations, there is a limit to the player's ability to respond. For these reasons, the possibility that bidirectional actions may not be established in some cases cannot be eliminated. Accordingly, it is desirable to reduce the feeling of dissatisfaction in viewing users and suppress a reduction in the number of user operations. Also, in the case where a musical performance is livestreamed, for example, a performer or a staff member at a venue or the like may be the distributor. When the distributor is different from the performer, it may still be unable to respond immediately with appreciations in response to user operations by viewing users.

Accordingly, in the distribution service of the distribution system 100, when a viewing user performs a user operation, at least one video is selected from among a plurality of preset appreciation videos. Thereafter, the selected appreciation video is distributed to at least the reproduction terminal 20 used for user operation, such as the posting, by the viewing user who performed the user operation. Hereinafter, an overview of the distribution system 100 according to the present embodiment will be described.

As an example, a game video of a game played by game terminals 70 communicating with each other is distributed to the reproduction terminal 20 of each viewing user. The game server 60 acquires game screens from the game terminals 70 to generate the game video, and also controls the game such as by managing wins and losses. In addition, the game video is recorded in the game server 60, and the game server 60 uploads the game video on the distribution server 30. Alternatively, a commentator who provides commentary on another person's game may upload a commentary video from the commentator's own server to the distribution server 30. In this case, the target of comments posted and rewards contributed by viewing users and the like may also be the commentator.

The distribution server 30 distributes a viewing video to the reproduction terminal 20 of each viewing user. Each viewing user can play and view the viewing video using the viewing user's own reproduction terminal 20. Each viewing user can also perform user operations such as posting a comment using the reproduction terminal 20. User operations are achieved by the functions of an application program preinstalled in the reproduction terminal 20. The application program may be downloaded from the distribution server 30, the management server 10, the game server 60, or another external server. Alternatively, the user operation may be achieved by the functions of a web page provided by the distribution server 30. The management server 10 also manages comments posted by viewing users, manages rewards contributed by viewing users, and the like. Furthermore, the management server 10 transmits operation information including the user identification information of the viewing user and input information such as comment content to the distribution server 30.

Meanwhile, the players compete in the game on the game terminals 70 that communicate with each other. In addition, the game server 60 continuously acquires and records game screens during the competition as a game video. As an example, in the case where the players both look at the same game screen, like in fighting games and sports games, the game server 60 acquires the game screen from one of the game terminals 70. In the case where the players look at different game screens, like in FPS games and TPS games, the game server 60 acquires the game screen from each of the game terminals 70. As described above, the game server 60 may also provide competition management such as matchmaking between players. Furthermore, as player management, the game server 60 may store and manage competition history information such as win/loss counts and opponents associated with the player identification information of each player, for example.

The game server 60 generates the game video from the acquired game screen and transmits the game video to the distribution server 30. Besides, the game server 60 may also acquire a camera video from a camera capturing a competing player. The game server 60 transmits the acquired camera video to the distribution server 30 as a game video or as a game video in which the camera video is superimposed onto a portion of the game screen. Alternatively, the distribution server 30 may acquire a camera video from a camera capturing a competing player. In this case, the distribution server 30 generates a viewing video with the game screen and the camera video contained in predefined areas, and distributes the viewing video to the reproduction terminals 20 of the viewing users. Also, the distribution server 30 distributes the acquired camera video to the reproduction terminal 20 as a viewing video. As another example, the distribution server 30 may distribute the game video and the camera video as separate viewing videos, and the both videos may each be displayed on the reproduction terminal 20 or the reproduction terminal 20 may combine and display the both videos at the same time. The both videos can be combined using an application program preinstalled in the reproduction terminal 20. Furthermore, the game server 60 may receive, from the game terminals 70, game operation information by the players, NPC control information in the case where NPC exists, and the like. In this case, the game server 60 generates the game video by launching the game and recreating the game screen on the basis of the received game operation information and the like. With this arrangement, the amount of communication from the game terminals 70 to the game server 60 can be reduced. Alternatively, the distribution server 30 may acquire game operation information and the like from the game terminals 70 via the game server 60. In this case, the distribution server 30 generates the game video by recreating the game screen.

For example, the distribution server 30 livestreams the viewing video and also distributes comments posted by viewing users and the like to the reproduction terminal 20 of each viewing user. An application program is preinstalled in the reproduction terminals 20 of the viewing users, and the viewing users can use the application program to perform user operations such as posting a comment. For example, when the viewing user launches the application program, a video area in which the viewing video is displayed and an operation area containing an input field for inputting comments and a reward icon for contributing a reward or the like are displayed on the reproduction terminal 20. Furthermore, a comment area in which distributed comments are displayed is displayed on the reproduction terminal 20. The video area, the operation area, and the comment area are displayed distinctly, and a viewing user can perform user operations in the operation area. Alternatively, similar area segmentation and operation input may be achieved on a web page provided by the distribution server 30. Also, comments and the like posted by viewing users may be displayed on a distributor screen in a display area provided separately from the display area of the viewing video. The distributor looks at the comments and the like displayed in the display area and executes actions such as saying thank you or inputting an appreciation comment while livestreaming. Furthermore, if there is an action from a particular viewing user (for example, a viewing user with a large post count), an indication of the action may be displayed in an emphasized way on the distributor screen.

A viewing user performs a user operation such as posting a comment or contributing a reward from the viewing user's own reproduction terminal 20 while the viewing video is being distributed. The reproduction terminal 20 transmits the content of the inputted comment, the content of the selected reward, or the like to the management server 10. The reproduction terminal 20 may also transmit the content of the comment or reward together with user identification information (for example, a user ID) assigned to each viewing user. Besides, the reward provided to a player or the like is an expendable medium such as money, token money, virtual currency, cryptocurrency, electronic money, or points, for example. Alternatively, the reward may be in-game currency or a bonus such as an item usable in the game service provided by the game server 60. Furthermore, the reward may also be tangible objects such as goods.

The management server 10 receives a user operation and generates operation information. As an example, the management server 10 generates operation information including the user identification information of the viewing user and input information such as the content of a comment associated with the user identification information. The management server 10 also generates operation information including operation identification information (for example, an operation ID) that identifies the type of selected reward and user identification information associated with the operation identification information. For example, the management server 10 acquires the user identification information when the viewing user logs in. Alternatively, the distribution server 30 may receive input information such as the content of a comment and generate operation information. Besides, since it is sufficient if appreciation data can be distributed, the management server 10 may also acquire, from the reproduction terminal 20, terminal identification information (for example, a terminal ID) that identifies the reproduction terminal 20 of each viewing user instead of the user identification information. Alternatively, the management server 10 may acquire an Internet Protocol (IP) address or a media access control (MAC) address as the terminal identification information. Thereafter, the management server 10 transmits the generated operation information to the distribution server 30.

When operation information is received from the management server 10, the distribution server 30 distributes a video selected from among the plurality of appreciation videos stored in advance. For example, the distribution server 30 randomly selects video identification information (for example, a video ID) that identifies each appreciation video. Thereafter, the distribution server 30 distributes the appreciation video corresponding to the selected video identification information. Here, appreciation videos are prepared in advance for cases where the distributor (for example, the player) cannot respond with an appreciation to a comment or the like from a viewing user. For example, an appreciation video is a video approximately 5 seconds long and obtained by capturing a scene in which the player is saying thanks or posing a thankful pose. Alternatively, text, an image, or the like signifying thanks or an animation saying thanks or adopting a thankful pose may be distributed.

When selecting an appreciation video, a reference may be performed to determine which competing player is the subject of a posted comment or the like. For example, the viewing user selects in advance a player to cheer or a team to which the cheered player belongs. The viewing user may make the player selection when the viewing user posts a comment. In this case, the reproduction terminal 20 transmits information specifying the player to the management server 10. The viewing user may also make the player selection in advance and cause the selection to be stored in the management server 10. In this case, the management server 10 stores information (for example, a player ID) specifying the player in association with the user identification information. Thereafter, the distribution server 30 references the information specifying the player to select an appreciation video related to the player from an appreciation data group RD (FIG. 2), which is one example of a distribution data group. Incidentally, the viewing user may also be able to select both competing players. With this arrangement, the viewing user who wants to post a comment to both players can be satisfied. In this case, the distribution server 30 selects an appreciation video related to both players, such as a video obtained by capturing both players, from the appreciation data group RD. Furthermore, for example, in the case where the distributor is a member of the venue staff at a live music concert, the staff member uploads an appreciation video of a performer. Thereafter, an appreciation video associated with information specifying the performer may be selected only with respect to a comment or the like posed by a viewing user while the live music concert is being held.

When an appreciation video is selected, the distribution server 30 generates a viewing video with the appreciation video superimposed onto a portion of the game video (for example, the upper-right corner of the game video) and distributes the viewing video to each reproduction terminal 20. In this case, the appreciation video is also distributed to viewing users who did not perform a user operation such as posting a comment. However, the distribution server 30 may also distribute the appreciation video only to the viewing user who performed the user operation. In the generated viewing video, the game video and the appreciation video are combined. Besides, each appreciation video may also be generated automatically when operation information is received. For example, the username of the viewing user may be included in the operation information, and the distribution server 30 may generate an appreciation video including the username. The distribution timing of the appreciation video is immediately after the user operation such as posting a comment is performed, but may also be a timing delayed by a prescribed time from the user operation or a preset timing such as immediately before the end of the distribution of the viewing video.

[Control System of Distribution System]

Next, FIG. 2 will be referenced to describe the control system of the distribution system 100 that distributes a viewing video to the reproduction terminal 20 of each of a plurality of users who are viewers. First, the management server 10 is provided with a server control part 11, a server storage part 12, and a communication part not illustrated. When a user operation by a viewing user is received from the reproduction terminal 20, the server control part 11 executes various forms of control for generating and transmitting operation information to the distribution server 30. Also, the server storage part 12 stores a management program PG1 and management data MD used to manage viewing users.

The distribution server 30 is provided with a distribution control part 31, a distribution storage part 32, and a communication part not illustrated. The distribution control part 31 executes various forms of control for distributing a game video received from the game server 60. Also, the distribution storage part 32 stores a distribution program PG2 and distribution data DD including the appreciation data group RD. The distribution of a viewing video by the distribution server 30 may be in any format that distributes video to users all at once, and may be a livestreaming format in which video is distributed in real-time, or a non-real-time format in which recorded or edited video is distributed, for example. Moreover, the format is not limited to distributing video all at once, and may also be a format for on-demand distribution in which video is distributed individually according to an operation by each user.

The game server 60 is provided with a game control part 61, a game storage part 62, and a communication part not illustrated. The game control part 61 executes various forms of control for providing a game service to the game terminal 70. Furthermore, the game control part 61 records and stores the game screen in the game storage part 62, and uploads the game screen to the distribution server 30 as a game video. The game storage part 62 also stores a control program of the game server 60, player data which is information related to the players of the game, and game data which is information related to the game. As an example, the player data includes player identification information, personal information about the players, and the like. Also, the game data includes various data such as image data, BGM data, and play data about the players. Play data is data for carrying over content specific to each player to the next and subsequent plays, such as a play history (for example, past achievements) of the player.

The server control part 11, the distribution control part 31, and the game control part 61 are configured as computers combining a processor that executes various types of computational processing and operational control in accordance with a prescribed program, an internal memory necessary for operations by the processor, and other peripheral devices. As an example, the processors are central processing units (CPUs) or micro-processing units (MPUs) that control the device as a whole and also centrally control various processes on the basis of a prescribed program.

The server storage part 12, the distribution storage part 32, and the game storage part 62 are storage devices including a non-transitory computer-readable storage medium. Additionally, the server storage part 12, the distribution storage part 32, and the game storage part 62 include storage devices such as random access memory (RAM) which is system working memory with which the processor operates, and read-only memory (ROM), a hard disk drive (HDD), and a solid-state drive (SSD) that store programs and system software. The processor can execute a variety of processing operations, such as calculation, control, and determination operations, in accordance with a program stored in the ROM or the HDD. The management program PG1 and the distribution program PG2 cooperate to function as a computer program of the distribution system 100. Furthermore, the server storage part 12, the distribution storage part 32, and the game storage part 62 may store all data in a single storage device or store data in a distributed way across a plurality of storage devices.

A display device that displays the device input state, setting state, measurement results, and various information are connected to the server control part 11, the distribution control part 31, and the game control part 61 in a wired or wireless way. Also, an operating device including a keyboard or various switches for inputting prescribed instructions and data is connected to the server storage part 12, the distribution storage part 32, and the game storage part 62 in a wired or wireless way. Incidentally, the server control part 11, the distribution control part 31, and the game control part 61 may also control in accordance with a program stored in a portable recording medium such as a Compact Disc (CD), a Digital Versatile Disc (DVD), a Compact Flash (CF) card, or Universal Serial Bus (USB) memory, in a server on the Internet, or some other external storage medium.

The reproduction terminal 20 is provided with a reproduction control part 21, a reproduction storage part 22, an operation part 23 that serves as an operating device, a display part 24 that serves as a display device, a speaker 25 that serves as a sound output device, and a communication part not illustrated. The reproduction storage part 22 stores a control program of the reproduction terminal 20 and a viewing video reproduction program which is one example of an application program. The reproduction control part 21 controls the reproduction terminal 20 and also executes a reproduction program to thereby cause the display part 24 to display a viewing video. Also, the operation part 23 is an operating device such as a controller or a touch panel, and receives the input of user operations by a viewing user. Also, the display part 24 is a display device such as a television, a display, or a touch panel, and displays a viewing video to be viewed by the user. The operation part 23 and the display part 24 may be configured in a unified way as a display-operation part such as a touch panel. The speaker 25 outputs related sound such as game sound accompanying the reproduction of a viewing video. Furthermore, the operation part 23, the display part 24, and the speaker 25 may be integral parts of the reproduction terminal 20 or separate therefrom.

The game terminal 70 is provided with a terminal control part 71, a terminal storage part 72, a game operation part 73, a game display part 74, and a communication part not illustrated. The terminal storage part 72 stores a control program of the game terminal 70 and a game program. The terminal control part 71 controls the game terminal 70 and also executes the game program to thereby enable a player to play a game. Also, the game operation part 73 is an operating device such as a controller or a touch panel, and receives the input of game operations by a player. The game operation part 73 and the game display part 74 may be configured in a unified way as a display-operation part such as a touch panel. Furthermore, the game terminal 70 may also be provided with a camera that captures the player and the like. In this case, the game terminal 70 transmits the game screen together with a camera video captured by the camera to the game server 60. Alternatively, the camera may be provided separately from the game terminal 70. In this case, the camera may transmit the camera video to the game server 60 or to the distribution server 30.

The game display part 74 is a display device such as a display or a touch panel, and displays the game screen of the game played by the player. The game operation part 73 and the game display part 74 may be integral parts of the game terminal 70 or separate therefrom. Furthermore, the game terminal 70 is provided with a sound output device not illustrated. Besides, the terminal control part 71 executes a game program to control the progress of the game, but may also cooperate with the game control part 61 to control the progress of the game. For example, the game control part 61 may control the progress of at least a portion of the game, and the terminal control part 71 may cause the result to be displayed on the game display part 74. The game control part 61 may also collect play data from the game terminal 70 and manage collected play data. Furthermore, the game control part 61 of the game server 60 collects, from the game terminal 70, a game video or game operation information and the like for reconstructing a game video.

The reproduction control part 21 and the terminal control part 71 are configured as computers combining a processor that executes various types of computational processing and operational control in accordance with a prescribed program, an internal memory necessary for operations by the processor, and other peripheral devices. As an example, the processors are CPUs or MPUs that control the device as a whole and also centrally control various processes on the basis of a prescribed program. Incidentally, the reproduction control part 21 and the terminal control part 71 may also control in accordance with a program stored in a portable recording medium such as a CD, a DVD, a CF card, or USB memory, in a server on the Internet, or some other external storage medium.

The reproduction storage part 22 and the terminal storage part 72 are storage devices including a non-transitory computer-readable storage medium. Additionally, the reproduction storage part 22 and the terminal storage part 72 include storage devices such as RAM which is system working memory with which the processor operates, and ROM, an HDD, and an SSD that store programs and system software. The processor can execute a variety of processing operations, such as calculation, control, and determination operations, in accordance with a control program stored in the ROM or the HDD. Furthermore, the reproduction storage part 22 and the terminal storage part 72 may store all data in a single storage device or store data in a distributed way across a plurality of storage devices.

[Management Server]

The server control part 11 of the management server 10 is provided with an operation reception part 111 which is one example of an operation reception unit that receives user operations inputted from each reproduction terminal 20. Furthermore, the server control part 11 includes an information generation part 112 which is one example of an information generation unit that generates operation information and a compensation reception part 113 which is one example of a compensation reception unit that receives a payment of compensation for a user operation. The operation reception part 111, the information generation part 112, and the compensation reception part 113 are logical devices implemented by a combination of the hardware resources of the server control part 11 and the management program PG1 as software resources. The user operation is an operation performed in relation to viewing a video, and, as one example, is an operation for inputting a comment or contributing a reward, and the like.

The operation reception part 111 receives a user operation by a viewing user inputted into the reproduction terminal 20. Specifically, the operation reception part 111 acquires, from the reproduction terminal 20, operation identification information (for example, the operation ID) that identifies the type of user operation and terminal identification information or user identification information. Furthermore, the operation reception part 111 acquires input information such as the content of a comment from the reproduction terminal 20. Thereafter, the operation reception part 111 passes the acquired information to the information generation part 112. Furthermore, the operation reception part 111 may receive operations for changing the reproduction speed of a viewing video, changing the size of the video area, starting or stopping reproduction, and the like as operations by the user. As an example, the viewing user can execute each operation by selecting an icon or the like overlaid onto or arranged beside the video area on the distribution screen.

The operation reception part 111 may also receive an input operation of a special command as a user operation. For example, when the viewing user inputs a preset, specific keyword into a comment, the operation reception part 111 acquires, from the reproduction terminal 20, operation identification information corresponding to a special command. Thereafter, the operation reception part 111 passes the acquired operation identification information to the information generation part 112. The information generation part 112 generates operation information including the acquired operation identification information. Alternatively, the operation reception part 111 may determine whether a preset, specific keyword is included in a comment. In this case, when it is determined that a specific keyword is included, the operation reception part 111 passes operation identification information corresponding to a special command to the information generation part 112. Thereafter, the distribution server 30 distributes an appreciation video corresponding to the keyword to the reproduction terminal 20.

This arrangement makes it possible to give viewing users the fun of searching for special commands, like a treasure hunt. Besides, in the case where another selection condition, for example, a selection condition regarding an appreciation video corresponding to an operation attribute described later, is imposed at the same time as the selection condition regarding an appreciation video corresponding to a special command, the selection condition regarding an appreciation video corresponding to the special command may be prioritized. With this arrangement, the viewing user may suddenly see an appreciation video that the viewing user is not accustomed to seeing, and experience a sense of novelty.

The information generation part 112 generates operation information, and the server control part 11 transmits the generated operation information to the distribution server 30. Specifically, the information generation part 112 references the management data MD to generate operation information based on the information received from the operation reception part 111. For example, the information generation part 112 references the management data MD to specify attribute-specifying information, and generates operation information including the attribute-specifying information. As an example, the attribute is an operation attribute of a user operation, a comment attribute of a comment, or a user attribute of each user. Additionally, the attribute-specifying information indicates an operation attribute, a comment attribute, or a user attribute.

For example, the operation attribute is an attribute corresponding to the type of each user operation such as inputting a comment or contributing a reward. Also, the attribute corresponding to contributing a reward is different depending on the amount or type of the reward. For example, the information generation part 112 may acquire, from the operation reception part 111, operation identification information corresponding to the amount of the reward, and include the acquired operation identification information in the operation information. Furthermore, the operation attribute may be different for each player treated as the target of a comment, a contributed reward, or the like. For example, the operation identification information may be different between when inputting a comment with respect to a player A and when inputting a comment with respect to a player B competing against the player A. Also, the comment attribute is an attribute classified according to the nature of the comment, such as good, bad, interesting, or boring. Furthermore, the user attribute is an attribute such as gender or age that corresponds to each user.

For example, the attribute-specifying information indicating the operation attribute is operation identification information, and the information generation part 112 acquires the operation identification information from the operation reception part 111. For example, the information generation part 112 generates operation information including operation identification information that identifies the type of selected reward and user identification information associated with the operation identification information. Also, the attribute-specifying information indicating the comment attribute is comment identification information (for example, a comment ID), and the information generation part 112 determines the content of the comment and includes the comment identification information in the operation information. For example, the information generation part 112 analyzes a sentence included in the comment, and if characters signifying expectation or cheer, such as "Go for it", "I'm counting on you", or "Nice catch" are included in the comment, the information generation part 112 includes comment identification information indicating a positive nature in the operation information. On the other hand, if characters signifying jeering, bashing, or the like are included in the comment, the information generation part 112 includes comment identification information indicating a negative nature in the operation information. Additionally, if a comment contains only characters that cannot be classified as either positive or negative, the information generation part 112 includes comment identification information indicating a neutral nature in the operation information.

Furthermore, if a comment contains characters that can specify a player, such as a player's name, the information generation part 112 includes comment identification information indicating the player in the operation information. Alternatively, the attribute-specifying information may also indicate that appreciation data is not to be distributed. In this case, a selection part 131 (described later) of the distribution server 30 does not select appreciation data, and therefore appreciation data is not distributed. For example, if a comment contains a keyword that does not exist, such as the name of a player from a previous match, the information generation part 112 includes, in the operation information, comment identification information indicating that the comment should be ignored and that appreciation data is not to be distributed. Besides, the information generation part 112 may also generate operation information including user identification information of the viewing user and the content of a comment associated with the user identification information.

Furthermore, the attribute-specifying information indicating the user attribute is attribute identification information (for example, an attribute ID), and the information generation part 112 references user information UI in the management data MD to include the attribute identification information in the operation information. For example, the user information UI includes the gender or age of the user associated with the user identification information. The information generation part 112 acquires the user identification information from the operation reception part 111 and specifies the gender or age as the user information UI corresponding to the user identification information. Thereafter, the information generation part 112 generates operation information including the attribute identification information corresponding to the specified user information UI.

Furthermore, the information generation part 112 may reference the user information UI and include, in the operation information, history identification information (for example, a history ID) as an operation history. For example, the user information UI includes information associated with the user identification information, and the information is related to a history of operations by the viewing user, such as the post count of comments in a prescribed period or the total contribution amount of rewards. The information generation part 112 acquires the user identification information from the operation reception part 111 and specifies the post count or the total contribution amount from the user information UI corresponding to the user identification information. Thereafter, the information generation part 112 generates operation information including the history identification information corresponding to the specified post count or the total contribution amount. For example, the information generation part 112 includes history identification information indicating that the post count is higher than the prescribed count, when determining that the specified post count is higher than a prescribed count. The information generation part 112 includes history identification information indicating that the post count is lower than the prescribed count, when determining that the specified post count is lower than a prescribed count.

When the operation reception part 111 receives operation identification information corresponding to a contributed or provided reward from the reproduction terminal 20, the compensation reception part 113 determines that a payment of compensation will occur. The compensation reception part 113 causes the display part 24 of the reproduction terminal 20 to display a compensation payment screen (not illustrated) with respect to the user operation. The viewing user selects the monetary amount of a reward displayed on the payment screen. Thereafter, the reproduction terminal 20 transmits settlement information including unique charging object information that identifies the selected user operation to a settlement server not illustrated. The settlement server performs a settlement process that expends a compensation to be charged which corresponds to the charging object information, and transmits the result of the settlement process to the reproduction terminal 20 and the management server 10. Incidentally, the compensation reception part 113 may also cause the display part 24 to display a link icon of a web page provided by the settlement server. When the user performs a touch operation on the link icon, the web page provided by the settlement server is displayed and the settlement process is performed through the web page. Moreover, besides money, the user can pay compensation by using information related to a card medium like a credit card or debit card, or by spending an expendable medium such as token money, virtual currency, cryptocurrency, electronic money, or points.

When settlement is completed, the reproduction terminal 20 causes the display part 24 to display the result of the settlement process. Also, in the case where settlement is completed and the compensation is paid, the compensation reception part 113 determines that the payment of compensation is complete and notifies the information generation part 112 about the completion of payment. Thereafter, the information generation part 112 generates operation information including operation identification information that identifies the type of the selected reward. Besides, when the server control part 11 transmits the operation information to the distribution server 30, the distribution server 30 distributes, to the reproduction terminal 20, an image, video, or the like including the content of the appreciation with respect to the reward. Furthermore, the compensation reception part 113 may receive payment of a compensation required to viewing the viewing video or appreciation data.

[Distribution Server]

The distribution control part 31 of the distribution server 30 is provided with a selection part 131 which is one example of a selection unit that selects, in response to a user operation, at least one piece of appreciation data from the appreciation data group RD (FIG. 3) including a plurality of pieces of appreciation data different from the viewing video. In other words, when triggered by the acquisition of operation information from a user operation that is different from an operation for selecting a viewing video, the selection part 131 selects appreciation data randomly or selects appreciation data that satisfies a prescribed condition from the appreciation data group RD including a plurality of pieces of appreciation data. Here, appreciation data is data such as a video, sound or speech, an image, or a combination of the above. The selection part 131 may also select a plurality of pieces of appreciation data, and in this case, the plurality of pieces of appreciation data are distributed. Furthermore, the appreciation data group RD may also include a sub-data group consisted of a plurality of pieces of appreciation data.

The distribution control part 31 is also provided with a distribution part 132 which is one example of a data distribution unit that distributes appreciation data selected by the selection part 131 to at least the reproduction terminal 20 on which the user operation has been inputted. Furthermore, the distribution control part 31 is provided with an acquisition part 133 which functions as an attribute acquisition unit that acquires attribute-specifying information, an information acquisition unit that acquires terminal identification information identifying the reproduction terminal 20 on which the user operation has been inputted, or a history acquisition unit that acquires an operation history of the viewing user who is the inputting user who inputs the user operation. The selection part 131, the distribution part 132, and the acquisition part 133 are logical devices implemented by a combination of the hardware resources of the distribution control part 31 and the distribution program PG2 as software resources.

As an example, the selection part 131 randomly selects at least one piece of appreciation data from the appreciation data group RD. Specifically, the server storage part 12 stores data identification information (for example, a data ID) that identifies appreciation data corresponding to each piece of appreciation data. Additionally, when the acquisition part 133 acquires operation information from the management server 10, the selection part 131 uses a random number table or the like to randomly specify data identification information. Thereafter, the selection part 131 selects the appreciation data corresponding to the specified data identification information. The distribution part 132 distributes the appreciation data selected by the selection part 131 to at least the reproduction terminal 20 on which the user operation has been inputted. Incidentally, the distribution part 132 may distribute the appreciation data to only the reproduction terminal 20 on which the user operation has been inputted, or distribute the appreciation data to the reproduction terminals 20 of all viewing users.

The appreciation data group RD may also include a plurality of sub-data groups, each of which is associated with different attributes. In this case, the selection part 131 specifies an attribute on the basis of the attribute-specifying information and selects appreciation data from the sub-data group associated with the specified attribute as appreciation data that satisfies a prescribed condition. Besides, the attributes associated the sub-data groups may also be partially common. Specifically, attributes are classified on the basis of an operation attribute of a user operation, a user attribute of each user, or a comment attribute of a comment. Additionally, each of the sub-data groups is configured to include a plurality of pieces of appreciation data associated with a prescribed common attribute. For example, the appreciation data group RD illustrated in FIG. 3 includes a sub-data group G1 including appreciation data 1 associated with a data ID 1 and attributes 1 and 3, and appreciation data 2 associated with a data ID 2 and attributes 1 and 3. Furthermore, the appreciation data group RD includes a sub-data group G2 including the appreciation data 1 and 2 and appreciation data 3 associated with a data ID 3 and attributes 2 and 3. Also, different attribute identification information is assigned to each of the attributes 1 to 3. In the case where the attributes are user attributes of the viewing users, for example, the attribute 1 indicates female, the attribute 2 indicates male, and the attribute 3 indicates the 20s as the age.

The acquisition part 133 that functions as an attribute acquisition unit acquires attribute identification information as the attribute-specifying information from the management server 10. Additionally, the acquisition part 133 passes the attribute identification information to the selection part 131. The selection part 131 specifies a user attribute on the basis of the attribute identification information and selects appreciation data from the sub-data group associated with the specified user attribute, for example, the gender. In the example in FIG. 3, when the specified attribute is female, the selection part 131 selects appreciation data from the sub-data group G1. In other words, the appreciation data 1 and the appreciation data 2 included in the sub-data group G1 are images, sound or speech, or video intended for women. Besides, it is possible for the selection part 131 to select appreciation data according to a combination of multiple selection methods. For example, the selection part 131 may specify the sub-data group G1 on the basis of the specified user attribute, and then select appreciation data at random from within the sub-data group G1.

As an example, the sub-data groups of the appreciation data group RD include appreciation videos prepared according to the attribute of the viewing user such as personal information like gender, age, place of residence, place of origin, high school alma mater, and university alma mater, being a VIP member or paid member, or the like, and the selection part 131 selects an appreciation video from a corresponding sub-data group. For example, if there is a common attribute between the preregistered personal information of a player and the personal information of the viewing user share, attribute identification information corresponding to the common attribute is included in the operation information. Examples of the common attributes include the university alma mater or residing prefecture in the case where the player and the viewing user both have the same university alma mater or the same place of origin. The sub-data group selected in this case includes an appreciation video prepared according to the university alma mater or place of origin, and the selection part 131 selects an appreciation video from the corresponding sub-data group. Incidentally, the common attribute is determined by comparing information necessary for comparison in the personal information of the viewing user in the user information UI to information necessary for comparison in the personal information of the player stored in advance in the server storage part 12. For example, the personal information of the player is stored in association with information specifying the player. Also, the personal information of the viewing user is stored in association with user identification information.

For example, in the case where the place of origin is in common, an appreciation video containing the speaking in the dialect of the region is included in the sub-data group. When the selection part 131 selects such an appreciation video, the viewing user viewing the appreciation video can feel a sense of familiarity with the player. Also, as an example, a viewing user can become a VIP member by satisfying a condition such as that the total amount of money spent on the distribution service has reached a prescribed amount. As another example, a viewing user can become a VIP member by having a monthly paid membership or a premium membership. When a viewing user becomes a VIP member, a VIP attribute is conferred to the user information UI of the viewing user. For example, when the viewing user who is the VIP member performs the comment posting or the like, the selection part 131 selects an appreciation video from a sub-data group including special appreciation videos intended for VIP members. Alternatively, only one type of special appreciation video may be prepared, and the selection part 131 may select the special appreciation video.

The attribute identification information may also be different depending on each player, each personal information of the viewing user, or each class of membership. Also, a plurality of pieces of attribute identification information may be included in the operation information for a single user operation. For example, the data identification information of appreciation data may be associated with attribute identification information indicating a player, attribute identification information indicating personal information, and attribute identification information indicating a class of membership. The attribute identification information indicating a class of membership indicates whether the appreciation video is for VIP members. Also, the attribute identification information indicating a player indicates which player the appreciation video is associated with. Besides, the attribute identification information indicating a player may also be associated with each piece of data identification information for all appreciation videos.

Also, in the case where the attributes are operation attributes of user operations, for example, the attribute 1 indicates inputting a comment, the attribute 2 indicates contributing a high-value reward, and the attribute 3 indicates contributing a low-value reward. The acquisition part 133 that functions as an attribute acquisition unit acquires operation identification information as the attribute-specifying information from the management server 10. Additionally, the acquisition part 133 passes the operation identification information to the selection part 131. The selection part 131 specifies an operation attribute on the basis of the operation identification information and selects appreciation data from the sub-data group associated with the specified operation attribute, for example, inputting a comment. In the example in FIG. 3, if the specified attribute is inputting a comment, the selection part 131 selects appreciation data from the sub-data group G1. In other words, the appreciation data 1 and the appreciation data 2 included in the sub-data group G1 are appreciations with respect to inputting a comment.

That is, the sub-data groups of the appreciation data group RD include appreciation videos prepared according to the type of user operation such as posting a comment, and the selection part 131 selects an appreciation video from the sub-data group. For example, in the case where the management server 10 receives the input of a comment, the selection part 131 selects an appreciation video from a sub-data group that includes appreciation videos with respect to comments. Also, in the case where the management server 10 receives the contribution of a reward, the selection part 131 selects an appreciation video from a sub-data group that includes appreciation videos with respect to rewards. Furthermore, in the case where the reward is a gift, for example, in the case where a viewing user pays compensation to purchase a gift and provides the gift to a player, the selection part 131 may select an appreciation video from a sub-data group that includes appreciation videos according to the type of gift. The selection part 131 may also select an appreciation video from a sub-data group that includes appreciation videos according to the monetary amount of the reward.

Furthermore, in the case where the attributes are comment attributes, for example, the attribute 1 indicates a positive nature, the attribute 2 indicates a negative nature, and the attribute 3 indicates a neutral nature. The acquisition part 133 that functions as an attribute acquisition unit acquires comment identification information as the attribute-specifying information from the management server 10. Additionally, the acquisition part 133 passes the comment identification information to the selection part 131. The selection part 131 specifies a comment attribute on the basis of the comment identification information and selects appreciation data from the sub-data group associated with the specified comment attribute, for example, a positive nature. In the example in FIG. 3, if the specified attribute is a positive nature, the selection part 131 selects appreciation data from the sub-data group G1. In other words, the appreciation data 1 and the appreciation data 2 included in the sub-data group G1 have the content of appreciations with respect to comments of a positive nature.

That is, the sub-data groups of the appreciation data group RD include appreciation videos prepared according to the content of a comment, and the selection part 131 selects an appreciation video from the sub-data group. For example, if it is determined, as a result of analyzing a comment in the management server 10, as a comment of a positive nature such as expectation or cheer, the selection part 131 selects an appreciation video from a sub-data group that includes appreciation videos with respect to comments of a positive nature. On the other hand, if it is determined as a comment of a negative nature such as jeering or bashing, the selection part 131 selects an appreciation video from a sub-data group that includes appreciation videos with respect to comments of a negative nature. Alternatively, the selection part 131 does not have to select the appreciation video, if it is determined as the comment of the negative nature. In this case, the comment identification information is information indicating that appreciation data is not to be distributed.

Also, a comment attribute may indicate that the comment is directed to a specific person. For example, in the case where, as a result of analyzing a comment in the management server 10, the comment contains characters specifying a person for example, a specific player, comment identification information indicating that the comment is directed to the player is included in the operation information. Thereafter, the selection part 131 selects an appreciation video from a sub-data group that includes appreciation videos associated with the player. Besides, if the player does not exist, for example, in the case where a player from a previous match, comment identification information indicating that appreciation data is not to be distributed is included in the operation information, and the selection part 131 does not select an appreciation video.

Furthermore, the appreciation data group RD may also include a plurality of sub-data groups, each of which is associated with different activity types. For example, in the appreciation data group RD illustrated in FIG. 3, the appreciation data is associated with activity types from type 1 to type 3. Additionally, the appreciation data group RD includes a sub-data group G3 including appreciation data 4 associated with a data ID 4 and types 1 and 2, and appreciation data 5 associated with a data ID 5 and types 1 and 2. Furthermore, the appreciation data group RD includes a sub-data group G4 including the appreciation data 4 and 5 and appreciation data 6 associated with a data ID 6 and types 2 and 3. As an example, the type 1 indicates that the post count within a prescribed period exceeds a prescribed count, and the type 2 indicates that the post count within a prescribed period does not exceed the prescribed count. Also, the type 3 indicates that the total contribution amount exceeds a prescribed monetary amount. In addition, different history identification information is assigned to each of the type 1 to type 3.

The acquisition part 133 that functions as a history acquisition unit acquires history identification information as an operation history from the management server 10. Additionally, the acquisition part 133 passes the history identification information to the selection part 131. The selection part 131 determines the activity type of the inputting user on the basis of the attribute identification information. Furthermore, the selection part 131 selects appreciation data from a sub-data group associated with the determined activity type as appreciation data that satisfies a prescribed condition. In the example in FIG. 3, if the specified activity type indicates that the post count within a prescribed period exceeds a prescribed count, the selection part 131 selects appreciation data from the sub-data group G3. In other words, the appreciation data 4 and the appreciation data 5 included in the sub-data group G3 are images, sound or speech, or video intended for viewing users with high post counts.

Furthermore, when the operation reception part 111 receives an operation for inputting a special command, the selection part 131 selects, from the appreciation data group RD, appreciation data associated with the special command as appreciation data that satisfies a prescribed condition. Specifically, when operation identification information corresponding to a special command is acquired from the acquisition part 133, the selection part 131 specifies an operation attribute on the basis of the operation identification information. Thereafter, the selection part 131 selects appreciation data from the sub-data group associated with the specified operation attribute, for example, inputting the special command.

Incidentally, a plurality of conditions may be set for the appreciation data selection modes. For example, the posting of a single comment or the like by a viewing user may fall under a plurality of selection conditions. In this case, multiple types of attribute identification information and the like is included in the operation information. Additionally, the selection part 131 selects appreciation data according to a preset order of priority such that certain prescribed attributes or the like are prioritized.

To provide the distribution service, the distribution part 132 generates a viewing video combining a game video and a distribution screen, and distributes the generated viewing video to the reproduction terminal 20. As an example, the distribution part 132 displays a game video and a distribution screen on a web page accessed by a viewing user. Thereafter, the viewing user inputs a user operation by operating an input field, an icon for operation, and the like displayed by an application program of the reproduction terminal 20. Alternatively, the viewing user may also input a user operation by operating an input field, an icon for operation, and the like on the distribution screen. Also, the distribution part 132 distributes appreciation data selected by the selection part 131 to at least the reproduction terminal 20 on which the user operation has been inputted. As an example, the distribution part 132 generates a viewing video by combining an appreciation video, which is one example of appreciation data, and a game video, and distributes the generated viewing video to the reproduction terminal 20. The distribution part 132 may distribute the appreciation data to only the reproduction terminal 20 on which the user operation has been inputted, or distribute the appreciation data to all reproduction terminals 20 including the above reproduction terminal 20. Moreover, the distribution part 132 may distribute appreciation data separately from the viewing video, or distribute appreciation data without combining the appreciation data with the viewing video.

In the case where the appreciation data, for example, an appreciation video and the game video are separate, the area where the appreciation video is played does not necessarily have to partially overlap with the game video. For example, the appreciation video may also be displayed beside the game video at a position that does not affect the display of the game video on the distribution screen. Furthermore, in the case where the appreciation video and the game video are separate, the distribution server 30 may also distribute the game video and the appreciation video separately. In this case, the reproduction terminal 20 may display the game video and the appreciation video separately, or combine and display the game video and the appreciation video. Furthermore, the appreciation data may also be downloaded to the reproduction terminal 20 in advance before the start of viewing. In this case, the distribution part 132 distributes data identification information of the appreciation data selected by the selection part 131 to the reproduction terminal 20. Thereafter, the reproduction terminal 20 displays appreciation data stored in the reproduction storage part 22 on the basis of the data identification information. Likewise in this case, the reproduction terminal 20 may display the game video and the appreciation data separately, or combine and display the game video and the appreciation data.

Also, the reproduction terminal 20 may store video identification information, for example, as data identification information acquired from the distribution server 30. In this case, the distribution storage part 32 stores the video identification information of the appreciation video selected according to a user operation by the viewing user in association with the user identification information of the viewing user. Thereafter, when the viewing user logs in from the reproduction terminal 20, the appreciation video that was selected once can be viewed at any time. Also, the reproduction terminal 20 may store only video identification information, or store video identification information together with an appreciation video corresponding to the video identification information. Also, a viewing user may be able to view an appreciation video at any time for a fixed period from when an appreciation video is selected once, without having to post a comment or the like. However, the appreciation video that was selected once may be reselected when a comment is reposted or the like, even during the viewing period of the appreciation video that was selected once. This arrangement can prevent appreciation videos to be selected from running out, even in the case where a viewing user performs a large number of user operations in a short period.

In the case where the appreciation data is combined with the viewing video, the distribution part 132 also functions as a screen generation unit. The screen generation unit acquires screen composition data and the like included in the distribution data DD of the distribution storage part 32, and generates a distribution screen to be displayed at the same time as the game video. The distribution screen is generated as an image or video. For example, the screen generation unit generates a distribution screen in any of various formats such as MPEG format. As an example, the screen generation unit superimposes the generated distribution screen onto the game video to arrange. Specifically, the screen generation unit superimposes an upper layer including the distribution screen onto a lower layer including the display area of the game video. The upper layer is configured as a transparent image so as not to obstruct the display of the game video. Additionally, comment display fields and the like are displayed in the upper layer at respective display timings. For example, when a comment is posted, the content of the posted comment is displayed in the upper layer. Alternatively, the screen generation unit may arrange the distribution screen so as not to overlap with the game video.

Furthermore, when the selection part 131 selects appreciation data, the screen generation unit superimposes an upper layer including the selected appreciation data, for example, an appreciation video, onto a lower layer including the display area of the game video. With this arrangement, the appreciation video is displayed superimposed onto a portion of the game video. Alternatively, the screen generation unit may arrange the appreciation video so as not to overlap with the game video.

Also, when the acquisition part 133 acting as an information acquisition unit acquires terminal identification information that identifies the reproduction terminal 20 on which a user operation has been inputted, the distribution part 132 distributes appreciation data to the reproduction terminal 20 specified on the basis of the terminal identification information. As an example, the distribution part 132 acquires a terminal ID from the acquisition part 133 and distributes appreciation data to only the reproduction terminal 20 specified by the terminal ID.

Furthermore, the distribution system 100 may further acquire a related video captured by a camera (not illustrated) which is one example of an imaging device, and distribute the acquired related video to each reproduction terminal 20. For example, a camera and transmission device that transmits a video related to the game, such as a camera video, a player video, and a commentary video which are examples of a related video, are installed in the venue of a game competition. As an example, the transmission device is a computer device connectible to the camera and the network 50, and transmits a related video acquired from the camera to the distribution server 30. Thereafter, the distribution server 30 distributes the acquired related video to each reproduction terminal 20. Alternatively, the imaging device may be a camera installed in the game terminal 70. The game terminal 70 transmits a related video to the distribution server 30 directly or via the game server 60.

[Process Flow by Distribution System]

A process flow by the distribution system 100 will be described with reference to FIG. 4. The distribution system 100 starts the process when a prescribed start condition is satisfied. For example, in the case of livestreaming, the distribution system 100 starts the process when the distribution server 30 acquires a game video from the game server 60.

The distribution control part 31 of the distribution server 30 acquires a game video from the game server 60 (S101). Thereafter, the distribution part 132 of the distribution server 30 generates a viewing video (S102). Next, the distribution part 132 distributes the viewing video to the reproduction terminal 20 (S103). Thereafter, the reproduction terminal 20 causes the display part 24 to display the viewing video. When a viewing user logs in to the management server 10 and inputs a user operation from the reproduction terminal 20, the operation reception part 111 of the management server 10 receives the user operation (S201). Additionally, the information generation part 112 of the management server 10 generates operation information (S202) and transmits the generated operation information to the distribution server 30 (S203). After that, if there is a new user operation (YES in S204), the operation reception part 111 receives the user operation (S201). On the other hand, if there is not a new user operation (NO in S204), the management server 10 ends the process.

Also, in the case where operation information is not acquired from the management server 10 (NO in S104), the distribution part 132 continues to generate the viewing video (S102) and to distribute the viewing video (S103). On the other hand, when the acquisition part 133 of the distribution server 30 acquires operation information (YES in S104), the selection part 131 specifies the data identification information of appreciation data randomly, for example. Thereafter, the selection part 131 selects the appreciation data corresponding to the specified data identification information from the appreciation data group RD (S105). Also, the selection part 131 may select a sub-data group including appreciation videos prepared according to an attribute such as place of origin, and select an appreciation video from the selected sub-data group. Next, the distribution part 132 distributes the appreciation data selected by the selection part 131 to at least the reproduction terminal 20 on which the user operation has been inputted (S106). Besides, the selection part 131 may also select appreciation data from a sub-data group selected in accordance with each of the selection modes described above.

After that, in the case where distribution is to be ended because the viewing video has been played to the end or the like (YES in S107), the distribution system 100 ends the process. On the other hand, in the case where distribution is continued (NO in S107), the distribution part 132 continues to generate the viewing video (S102) and to distribute the viewing video (S103).

According to the first embodiment described above, appreciation data distributed to the reproduction terminal 20 as an appreciation with respect to a user operation is selected from among the appreciation data group RD that includes a plurality of pieces of appreciation data. With this arrangement, appreciation data selected from among a plurality of pieces of appreciation data can be distributed in response to an operation by a user who views a viewing video, and user satisfaction can be increased.

Incidentally, the distribution system 100 that distributes a viewing video to the reproduction terminal 20 of each of a plurality of users who are viewers may also be configured to include the game terminal 70 which is one example of a game device. In this case, the distribution system 100 is provided with the distribution part 132 which is one example of a video distribution unit that generates a viewing video from a game video of a game provided by the game terminal 70, and distributes the generated viewing video to each reproduction terminal 20. Furthermore, the distribution system 100 is provided with the operation reception part 111 that receives a user operation inputted from each reproduction terminal 20 and the selection part 131 that selects, in response to the user operation, at least one piece of appreciation data from an appreciation data group that includes a plurality of pieces of appreciation data. Additionally, the distribution part 132 also functions as a data distribution unit that distributes the appreciation data selected by the selection part 131 to at least the reproduction terminal 20 on which the user operation has been inputted. With such a distribution system 100, too, appreciation data selected from among a plurality of pieces of appreciation data can be distributed in response to an operation by a user who views a viewing video, and user satisfaction can be increased.

Furthermore, a single server device or a single apparatus having server functions may also function as the distribution system 100. For example, the device or apparatus is provided with the operation reception part 111 that receives a user operation inputted from each reproduction terminal 20 and the selection part 131 that selects, in response to the user operation, at least one piece of appreciation data from the appreciation data group RD that includes a plurality of pieces of appreciation data. Furthermore, the device or apparatus is also provided with the distribution part 132 which is one example of a data distribution unit that distributes appreciation data selected by the selection part 131 to at least the user terminal on which the user operation has been inputted.

Second Embodiment

Next, a second embodiment will be described with reference to FIG. 5. Incidentally, in the description of the second embodiment, the differences from the first embodiment will be described mainly, components already described will be denoted with the same reference signs, and a description of such components will be omitted. Except where specifically indicated otherwise, components denoted by the same reference signs exhibit substantially the same action and functions, and the effects of such components are also substantially the same.

In the second embodiment, when appreciation data is selected from among an appreciation data group, the selection part 131 executes a lottery in accordance with a set rarity. The selection part 131 specifies data identification information according to the lottery, and selects appreciation data corresponding to the specified data identification information. For example, a rarity is set for each of the plurality of pieces of appreciation data, and the rarity is associated with the data identification information. The rarity may be stored in the distribution storage part 32 in a table or list format, or the rarity may be included in the appreciation data. Thereafter, the selection part 131 carries out the lottery in accordance with the rarity to select appreciation data.

In other words, a winning probability in the lottery is set in advance as the rarity of each piece of appreciation data. The selection part 131 carries out the lottery in accordance with the winning probability to specify data identification information. Thereafter, the selection part 131 selects the appreciation data corresponding to the specified data identification information. A known method can be implemented as the lottery method. Also, the lottery may be executed multiple times such that appreciation data that has been won once in the lottery is excluded from consideration in the next lottery. With this arrangement, if the lottery is executed a number of times equal to the number of pieces of appreciation data, all of the appreciation data will be won. For this reason, if the lottery is carried out multiple times, a desired piece of appreciation data is guaranteed to be selected. With this arrangement, even if a piece of appreciation data has a high rarity and a low winning probability, the appreciation data is guaranteed to be won if a prescribed condition is satisfied. Accordingly, viewing users can be further motivated to perform user operations.

Also, the selection part 131 may execute a lottery on the condition that the operation information includes prescribed attribute identification information. For example, the selection part 131 executes a lottery in the case where the operation information includes attribute identification information indicating that the viewing user is a VIP member. In the case where a viewing user who is a VIP member performs the comment posting or the like, the selection part 131 selects appreciation data selected as a result of executing the lottery from a sub-data group consisted of a plurality of pieces of appreciation data intended for VIP members.

[Process Flow by Distribution System]

A process flow by the distribution system 100 of the second embodiment will be described with reference to FIG. 5. The distribution system 100 starts the process when a prescribed start condition is satisfied. For example, in the case of livestreaming, the distribution system 100 starts the process when the distribution server 30 acquires a game video from the game server 60.

The distribution control part 31 of the distribution server 30 acquires a game video from the game server 60 (S301). Thereafter, the distribution part 132 of the distribution server 30 generates a viewing video (S302). Next, the distribution part 132 distributes the viewing video to the reproduction terminal 20 (S303). Thereafter, the reproduction terminal 20 causes the display part 24 to display the viewing video. When a viewing user logs in to the management server 10 and inputs a user operation from the reproduction terminal 20, the operation reception part 111 of the management server 10 receives the user operation (S201). Additionally, the information generation part 112 of the management server 10 generates operation information (S202) and transmits the generated operation information to the distribution server 30 (S203). After that, if there is a new user operation (YES in S204), the operation reception part 111 receives the user operation (S201). On the other hand, if there is not a new user operation (NO in S204), the management server 10 ends the process.

Also, in the case where operation information is not acquired from the management server 10 (NO in S304), the distribution part 132 continues to generate the viewing video (S302) and to distribute the viewing video (S303). On the other hand, if the acquisition part 133 of the distribution server 30 acquires operation information (YES in S304), the selection part 131 specifies the data identification information of appreciation data by lottery (S305). Thereafter, the selection part 131 selects the appreciation data corresponding to the data identification information according to the lottery result from the appreciation data group RD (S306). Next, the distribution part 132 distributes the appreciation data selected by the selection part 131 to at least the reproduction terminal 20 on which the user operation has been inputted (S307).

After that, in the case where distribution is to be ended because the viewing video has been played to the end or the like (YES in S308), the distribution system 100 ends the process. On the other hand, in the case where distribution is continued (NO in S308), the distribution part 132 continues to generate the viewing video (S302) and to distribute the viewing video (S303).

According to the second embodiment described above, appreciation data distributed to the reproduction terminal 20 as an appreciation with respect to a user operation is selected according to a lottery result from the appreciation data group RD that includes a plurality of pieces of appreciation data. With this arrangement, appreciation data selected from among a plurality of pieces of appreciation data can be distributed in response to an operation by a user who views a viewing video, and user satisfaction can be increased. Furthermore, viewing users can be motivated to perform user operations for winning the high-rarity appreciation data.

Besides, in the second embodiment, the selection part 131 executes a lottery for selecting appreciation data from the appreciation data group RD or a sub-data group. For this reason, the selection part 131 may select a sub-data group associated with an attribute or activity type specified in the first embodiment as a population, and execute a lottery for selecting appreciation data from the sub-data group. Also, the distribution server 30 may store the data identification information of appreciation data that has been won once in the lottery over a prescribed period in association with user identification information. With this arrangement, the user can repeatedly view appreciation data that the user has won once, for example, an appreciation video, without having to perform a user operation again, for example, the contributing a reward.

Third Embodiment

Next, a third embodiment will be described. Incidentally, in the description of the third embodiment, the differences from the first and second embodiments will be described mainly, components already described will be denoted with the same reference signs, and a description of such components will be omitted. Except where specifically indicated otherwise, components denoted by the same reference signs exhibit substantially the same action and functions, and the effects of such components are also substantially the same.

In the third embodiment, the selection part 131 specifies, as appreciation data not included in the selection target from among the appreciation data group RD, for example, appreciation data that satisfies an exclusion condition for being excluded from the selection target. Thereafter, the selection part 131 selects, from among the remainder after excluding the specified appreciation data, appreciation data to be distributed to the user terminal on which the user operation has been inputted.

Specifically, the selection part 131 determines that the exclusion condition is satisfied in a case where a reproduction validity period set for each piece of appreciation data has elapsed. The selection part 131 then specifies the appreciation data for which the reproduction validity period has elapsed from among the appreciation data group RD, and excludes the specified appreciation data from the selection target. Thereafter, the selection part 131 selects appreciation data to be distributed to the user terminal from among the remaining appreciation data. This arrangement makes it possible to prevent old appreciation data from being distributed, even in cases where the types of appreciation data increase over time. On the other hand, if old appreciation data is distributed, viewing users lose interest in viewing the appreciation data. As an example of old appreciation data that is out of date, old appreciation data created in the last season (for example, a video in which the player who won in the last season gives thanks) is out of date with respect to the situation of the player in the viewing video in the current season (for example, the situation of the current season in progress). If such a video is distributed, the difference in the situations between the appreciation data and the viewing video will feel strange to the viewing users, and the viewing users will lose interest in viewing the appreciation data. Accordingly, by excluding such appreciation data from the selection target, a loss of interest in viewing appreciation data can be reduced.

The reproduction validity period (for example, a reproduction end date and time or an elapsed time from the upload period) can be set with respect to appreciation data by the distributor or the like of the viewing video who uploads the appreciation data. Furthermore, the reproduction validity period may also be changeable. The distribution storage part 32 stores the reproduction validity period in association with data identification information (for example, the data ID) of the appreciation data. The selection part 131 then specifies the appreciation data for which the reproduction validity period has elapsed from among the appreciation data group RD, excludes the specified appreciation data from the selection target, and selects the appreciation data to be distributed to the user terminal from among the remaining appreciation data. Also, the distribution storage part 32 may store a data creation period or upload period in association with the data identification information. The selection part 131 determines that the exclusion condition is satisfied in a case where the elapsed time since the data creation period or the upload period associated with the appreciation data has reached the reproduction validity period (for example, one year or one month) when selecting the appreciation data.

Furthermore, the reproduction validity period may be set to a prescribed time from an event that occurs within the game. For example, in the case where a game video of a baseball game is distributed, when a specific event such as a home run occurs within the game, for the duration of a prescribed time (for example, one minute), the selection part 131 selects an appreciation video showing the player celebrating the home run as special appreciation data with respect to user operations. Thereafter, when the prescribed time elapses, the selection part 131 excludes the special appreciation data associated with information that identifies the event from the selection target. As an example, the distribution server 30 receives a signal indicating the occurrence of an event or information indicating the occurrence timing from the game terminal 70 via the game server 60. When the prescribed time elapses from the timing at which the signal is received or the occurrence timing, the selection part 131 excludes the special appreciation data from the selection target. In other words, a restriction on distributing appreciation data is lifted for a prescribed time on the basis of a signal or information from the game terminal 70. Furthermore, even in the case where a viewing user performs the comment posting or the like within the prescribed time, a viewing user cheering for the opposing team of the team that hit the home run does not want to receive the distribution of an appreciation video showing the player celebrating the home run. Accordingly, the selection part 131 may also exclude the special appreciation data from the selection target with respect to specific actions such as the comment posting. Alternatively, the selection part 131 may exclude, from the selection target, special appreciation data that is not associated with information identifying a player or a home team set by the viewing user in advance. With this arrangement, special appreciation data associated with a subject of cheer is distributed only when an action is performed within a prescribed time by a viewing user who has set the team that generated the event (for example, a home run) as the subject of cheer. Incidentally, an event is not limited to a home run and may also be gaining a point, hitting for the cycle, making a double play, achieving a no-hitter, achieving a perfect game, or the like. In other words, an event can be set in any way such that an indication of the event occurring can be transmitted from the game terminal 70 at the time point when the event occurs. Moreover, an event is not limited to an event within a baseball game and may also be gaining a point in a soccer game, a character winning in a fighting game, or the like.

Besides, the exclusion condition is not limited to the reproduction validity period. For example, in the case where a season (for example, spring, summer, fall, or winter) associated with the data identification information does not match the season when the appreciation data is selected, the selection part 131 may exclude appreciation data associated with the non-matching seasons. As an example, the selection part 131 acquires the date and time from a real-time clock in the distribution server 30 to determine the season at the time of selection, and determines whether the season at the time of selection matches the season associated with the data identification information. With this arrangement, the reproduction of appreciation data in the wrong season can be prevented. Furthermore, in the case where the acquired user identification information matches the user identification information of a no-reproduction user associated with the data identification information in advance, the selection part 131 may exclude the appreciation data corresponding to the data identification information. As an example, the no-reproduction user is a viewing user who is prohibited from viewing certain prescribed appreciation data, and may be selected and preset by the distributor. With this arrangement, the distributor can individually restrict the distribution of appreciation data with respect to a viewing user or the like who discloses the content of appreciation data without permission. Also, the selection part 131 may acquire a play count of appreciation data, and when the play count has reached an allowed play count (such as one time or three times, for example) associated with the data identification information, the selection part 131 may exclude the appreciation data corresponding to the data identification information. As an example, the distribution storage part 32 stores, for each viewing user, the play count of each piece of appreciation data in association with user identification information. Additionally, the selection part 131 determines whether the play count of the appreciation data associated with the user identification information has reached a play count for permitting to play the appreciation data, and if so, excludes the appreciation data from the selection target.

As described above, in the case where a reproduction-allowed condition set for appreciation data is not satisfied (for example, when the reproduction validity period has elapsed), the selection part 131 determines that the exclusion condition is satisfied. The selection part 131 then specifies the appreciation data for which the reproduction-allowed condition is not satisfied from among the appreciation data group RD, excludes the specified appreciation data from the selection target, and selects the appreciation data to be distributed to the user terminal from among the remaining appreciation data. Besides, viewing users may perform user operations (for example, posting a comment or contributing a reward) multiple times with respect to a specific viewing video. In this case, if the same appreciation data is distributed consecutively, viewing users lose interest in viewing the appreciation data. Accordingly, to prevent the same appreciation data from being reproduced consecutively, the selection part 131 may specify appreciation data that does not satisfy the reproduction-allowed condition from the appreciation data group RD and exclude the specified appreciation data from the selection target. Also, to make appreciation data distributed to a viewing user in a viewing video distributed earlier be different from appreciation data distributed to the viewing user in a viewing video distributed later, the selection part 131 may specify the appreciation data distributed earlier and exclude the specified appreciation data from the selection target. For example, in the case where appreciation data is distributed multiple times in a prescribed period (for example, one month), the selection part 131 excludes the appreciation data distributed earlier from the selection target. In this case, the distribution storage part 32 may also store information identifying the distributed appreciation data for each viewing user or each distributor.

Also, in the data identification information of each piece of appreciation data, a play count of other appreciation data after the appreciation data has been reproduced once may be set as a reproduction-allowed condition. The distribution storage part 32 stores, for each viewing video, the number of times the appreciation data has been played in association with user identification information. The selection part 131 determines whether the play count of the other appreciation data after specific appreciation data is reproduced has reached a play count (for example, three times) set in the data identification information of the specific appreciation data. Additionally, when the play count has not been reached, the selection part 131 excludes the specific appreciation data. In other words, when the appreciation data is reproduced once, the selection part 131 excludes the appreciation data from the selection target until reaching the set play count. Additionally, when the set play count is reached, the selection part 131 includes the specific appreciation data in the selection target again, and selects appreciation data. For example, when other appreciation data is reproduced three times after specific appreciation data is reproduced, when the next appreciation data is selected, the specific appreciation data is included in the selection target again. In other words, when specific appreciation data is reproduced, other appreciation data needs to be reproduced a certain number of times until the specific appreciation data is included in the selection target again. Such management is performed with respect to each viewing user for every viewing video.

In addition, a reproduction resumption period for appreciation data that has been reproduced once may be set for each piece of appreciation data as a reproduction-allowed condition. When a timing of selecting appreciation data has not reach a reproduction resumption period set with respect to data identification information, the selection part 131 excludes the appreciation data corresponding to the data identification information. Such management is performed with respect to each viewing user for every viewing video. Furthermore, in the case where specific appreciation data is reproduced, if a reproduction start period is set for the appreciation data included in the selection target, the appreciation data is not distributed until the reproduction start period is reached. For this reason, the disclosure of story developments by a user who views appreciation data in an early period can be restricted until the reproduction start period. Also, as a reproduction-allowed condition, an elapsed period since the time when appreciation data is reproduced may be set as a no-reproduction period. The distribution storage part 32 stores the date and time when appreciation data is reproduced in association with user identification information. Additionally, if the elapsed period from the date and time when specific appreciation data is reproduced until the time the next appreciation data is selected does not exceed a set no-reproduction period, the selection part 131 excludes the specific appreciation data. Besides, at least two of a plurality of reproduction-allowed conditions may also be applied in an overlapping way.

Incidentally, excluded appreciation data may be a portion of the appreciation data included in the appreciation data group RD, or may be all of the appreciation data included in the appreciation data group RD. By excluding all of the appreciation data, it possible to prevent the consecutive reproduction of the same appreciation data. As an exception, when a specific viewing user executes many user operations such as posting comments or contributing rewards in a short period, and there is no more appreciation data available for reproduction to the viewing user, appreciation data may be released from exclusion. The appreciation data that is released from exclusion may be a portion of the appreciation data included in the appreciation data group RD, or may be all of the appreciation data included in the appreciation data group RD.

Furthermore, the no-reproduction period may also be the period from the uploading of appreciation data until the start of reproduction of the appreciation data. In this case, the distribution storage part 32 stores a reproduction start date and time or an elapsed period (for example, one month) from uploading associated with the data identification information of the appreciation data. Thereafter, when selecting appreciation data, the selection part 131 excludes appreciation data that has not reached the set reproduction start date and time from the selection target. Also, when the elapsed period from the date and time when specific appreciation data is uploaded until the time when appreciation data is selected has not reached the set elapsed period, the selection part 131 excludes the specific appreciation data from the selection target.

Moreover, the reproduction-allowed condition may also be that specific appreciation data is reproduced. In other words, a reproduction order for each piece of appreciation data may be set with respect to a set of appreciation data consisted of a plurality of pieces of appreciation data. For example, the distribution storage part 32 stores information indicating which number in the reproduction order has already been reproduced (for example, information enabling the specification of the next appreciation data to be reproduced) in association with the user identification information of the viewing user who plays back the set of appreciation data. The selection part 131 then excludes, from the selection target, other than the appreciation data specified by the information (for example, data identification information) enabling the specification of the next appreciation data to be reproduced. With this arrangement, a plurality of pieces of appreciation data that a viewing user will perceive as being connected in terms of content can be reproduced sequentially. By imparting a story element to appreciation data in this way, the experience of enjoying a story can be imparted to the viewing user. For this reason, the viewing user can be motivated to perform actions (for example, posting comments or contributing rewards). Also, when specific appreciation data is reproduced, a reproduction-allowed flag can be raised for appreciation data that should be reproduced next which is associated with the data identification information of the specific appreciation data. The selection part 131 excludes appreciation data for which the reproduction-allowed flag is not raised. With this arrangement, appreciation data can be reproduced in a sequence that follows a story.

Incidentally, the selection part 131 may also include, in the selection target, appreciation data that is not included in a set of appreciation data having a set reproduction order, and execute the selection. For example, the selection part 131 includes, in the selection target, other appreciation data that is not part of a story and appreciation data set to the first place in a sequence of a set of appreciation data, and executes the selection. At this point, if there are a plurality of sets of appreciation data, there may be a plurality of pieces of appreciation data set to the first place in a sequence. Thereafter, when the selection part 131 selects appreciation data set to the first place in a sequence, the selection part 131 excludes other appreciation data not included in the set of appreciation data until the appreciation data set to the last place in the sequence of the set of appreciation data containing the selected appreciation data is reproduced. Alternatively, the selection part 131 may also exclude, from the selection target, other appreciation data not included in the set of appreciation data until a reproduction validity period set for the set of appreciation data elapses.

Furthermore, in the case where a play count is set as a reproduction-allowed condition, a play count for other appreciation data may also be set with respect to the entire set of appreciation data. In other words, the selection part 131 excludes the set of appreciation data from the selection target so that reproduction of the set of appreciation data is not repeated consecutively. Additionally, when the set play count is reached, the selection part 131 includes the set of appreciation data in the selection target again, and selects appreciation data. Also, a no-reproduction period may be set with respect to a set of appreciation data or each piece of appreciation data in a set of appreciation data. For example, a reproduction start date and time set for appreciation data set next in the sequence of a set of appreciation data may be only after a prescribed period from the reproduction start date and time set for the previous piece of appreciation data in the sequence. With this arrangement, all viewing users are unable to view the appreciation data set next in the sequence until after the prescribed period elapses. For this reason, it is possible to prevent a user who views the appreciation data as soon as possible from disclosing the content of the story and causing other users who see the disclosure to lose the desire to view the appreciation data.

Furthermore, a plurality of pieces of specific appreciation data to be reproduced next after a single piece of appreciation data may also be set. In this case, when the appreciation data is reproduced sequentially, a branching story in which the story is different depending on the sequence can be formed. With this arrangement, even if a user who views the appreciation data as soon as possible discloses the content of the story, since the story development is different for each viewing user, it is possible to keep other users from losing the desire to view the appreciation data.

Also, the reproduction-allowed condition may be the same for all viewing users. For example, a specific reproduction-allowed attribute (such as place of residence or gender, for example) may be set as a reproduction-allowed condition with respect to appreciation data. For the reproduction-allowed attribute, a single attribute may be set or a plurality of attributes may be set in an overlapping way. This arrangement makes it possible to manage appreciation data to be distributed as a whole or manage the progression of a plurality of viewing users as a whole. As an example, the distribution storage part 32 stores information indicating a specific geographical area as a reproduction-allowed geographical area associated with the data identification information of specific appreciation data. Thereafter, when a place of residence identified by the personal information (for example, attribute identification information) of a viewing user acquired in advance is not included in the specific geographical area, the selection part 131 excludes the specific appreciation data from the selection target. Moreover, the distribution storage part 32 stores information indicating a male or female as a reproduction-allowed attribute associated with the data identification information of specific appreciation data. Thereafter, when a gender (for example, male) identified by the personal information of a viewing user acquired in advance is different from the gender (for example, female) identified by the reproduction-allowed attribute, the selection part 131 excludes the specific appreciation data from the selection target.

According to the third embodiment described above, the selection part 131 can select appreciation data to be distributed to a user terminal from among the remaining appreciation data obtained by excluding appreciation data that satisfies an exclusion condition. This arrangement makes it possible to keep viewing users from losing interest in viewing appreciation data or losing the desire to view appreciation data. Also, a story element can be imparted to appreciation data to entice actions by viewing users. Besides, the selection part 131 may also create an exclusion candidate list including the data identification information of appreciation data to be excluded from the selection target. An administrator of the distribution server 30, a distributor, or the like can review the exclusion candidate list and remove appreciation data excluded from the selection target. With this arrangement, the number of appreciation data candidates to be the selection target can be set to an appropriate state.

Fourth Embodiment

Next, a fourth embodiment will be described. Incidentally, in the description of the fourth embodiment, the differences from the first to third embodiments will be described mainly, components already described will be denoted with the same reference signs, and a description of such components will be omitted. Except where specifically indicated otherwise, components denoted by the same reference signs exhibit substantially the same action and functions, and the effects of such components are also substantially the same.

In the fourth embodiment, after the reproduction of appreciation data starts, a viewing user can perform a user operation such as posting a comment, contributing a reward, or inputting a rating with respect to appreciation data from the user's own reproduction terminal 20. The user operation can be performed at any timing during the reproduction of the appreciation data, or after the reproduction ends. The reproduction terminal 20 transmits the content of the inputted comment, the content of the selected reward, the content of the rating, or the like to the management server 10. Additionally, when the management server 10 receives the user operation, the management server 10 generates operation information, and transmits the generated operation information to the distribution server 30. For example, the distribution part 132 that functions as a screen generation unit combines an input field for a user operation with respect to appreciation data with a screen on which appreciation data selected by the selection part 131 in response to a user operation with respect to a game video is displayed.

In a first example, as illustrated in FIG. 6 which illustrates a scene in a viewing video, the screen is provided with a display field D1 for appreciation data, an input field IA1 for a user operation with respect to appreciation data, a display field D2 for a game video, and an input field IA2 for a user operation with respect to the game video. Additionally, the input field IA1 is provided with a posting button B1 for a comment and a contributing button B2 for a reward with respect to appreciation data. With this arrangement, when a viewing user wants to post a comment or contribute a reward with respect to appreciation data, the viewing user can input a user operation with respect to the appreciation data. Additionally, the input field IA2 is also provided with the posting button B1 for a comment and the contributing button B2 for a reward with respect to a game video. Incidentally, as an example, FIG. 6 shows a distribution of a recorded video (a video that may have been edited, as appropriate), and therefore the input field IA2 is provided with a play start button, a fast-forward button, a volume control button, and the like. In addition, a stop button, a pause button, a rewind button, and the like may also be provided in the input field IA2. In contrast, in the case of livestreaming, unnecessary buttons such as the play start button and the fast-forward button are not displayed. Also, the example in FIG. 6 illustrates a state in which a user operation is performed by a viewing user who has selected the offensive side as the support target, and only one display field D1 is displayed on the offensive side. In the case where a user operation is performed by a viewing user who has selected the defensive side, the display field D1 is displayed on the defensive side. Furthermore, the display field D1 is no longer displayed when the reproduction of the appreciation data ends. However, in the case where a user operation is performed after the reproduction of appreciation data ends, the input field IA1 for a user operation continues to be displayed.

On the left and right sides in FIG. 6, camera videos CV obtained by capturing competing players are displayed. Additionally, the display field D1 for appreciation data is provided temporarily in a portion of the screen and in an area different from the area where the game video is displayed. In this case, a posting button B1 with the characters "Comment", a contribution button B2 with the characters "Reward", and the like are provided below the display field D1. When the posting button B1 is operated, a comment input field (not illustrated) is additionally displayed. Thereafter, the viewing user inputs a comment into the comment input field. Also, when the contribution button B2 is operated, a selection screen (not illustrated) for inputting the contribution amount of a reward or the like is additionally displayed. The viewing user selects a monetary amount on the contribution amount selection screen.

Also, when a user operation is performed with respect to appreciation data and operation information is received from the management server 10, the selection part 131 re-selects at least one piece of appreciation data in response to the user operation with respect to the appreciation data. As an example, the selection part 131 executes the selection of appreciation data when triggered by the acquisition of the operation information according to a user operation. A user operation may be determined to be with respect to appreciation data according to the operation identification information included in the operation information. Specifically, in response to the user operation, the user identification information of the viewing user and the data identification information of the appreciation data are transmitted from the reproduction terminal 20, through the management server 10, to the distribution server 30. Thereafter, the distribution part 132 distributes appreciation data selected by the selection part 131 to the reproduction terminal 20. In other words, when a user operation such as posting a comment or contributing a reward is performed with respect to appreciation data, appreciation data is additionally selected and distributed in response to the user operation. With this arrangement, viewing users can be motivated to execute user operations with respect to appreciation data. In other words, user operations and the distribution of appreciation data can be executed repeatedly.

In addition, the selection part 131 may also acquire, from the management server 10 via the acquisition part 133, operation information including operation identification information that identifies a user operation with respect to appreciation data. Thereafter, the selection part 131 specifies an operation attribute on the basis of the operation identification information and selects appreciation data from the sub-data group associated with the specified operation attribute, for example, inputting a comment with respect to appreciation data. As an example, if the user operation is with respect to appreciation data forming a part of a story, the selection part 131 selects other appreciation data associated with the story. Also, the selection part 131 may select, as appreciation data, a video obtained by capturing a behind-the-scenes look at the shooting of the appreciation data or the like. Alternatively, when a user operation is performed with respect to appreciation data, the selection part 131 may select appreciation data that is not associated with a user operation with respect to appreciation data.

Besides, in FIG. 6, the camera videos CV and the appreciation video display field D1 are displayed in an overlapping way on the game video display field D2, but the game video display field D2, the camera videos CV, and the appreciation video display field D1 may also be displayed in a non-overlapping way. The positional relationships between the display fields may set appropriately. The same is also true of FIG. 7 described later.

In a second example, as illustrated in FIG. 7 which illustrates a scene in a viewing video, the screen is provided with a display field D1 for appreciation data, an input field IA1 for a user operation with respect to appreciation data, a display field D2 for a game video, and an input field IA2 for a user operation with respect to the game video. Additionally, the input field IA1 is provided with rating buttons B3 and B4 for inputting ratings with respect to appreciation data. With this arrangement, when a viewing user wants to rate appreciation data, the viewing user can input a rating with respect to the appreciation data. Additionally, when a user operation for inputting a rating with respect to appreciation data is performed, the selection part 131 selects at least one piece of distribution data such that the selection target is different depending on the rating. Also, the input field IA2 is also provided with a rating button B5 for inputting a good rating with respect to a game video. Besides, the input fields IA1 and IA2 may be further provided with a posting button for a comment and a contributing button for a reward.

Camera videos CV are displayed on the left and right sides in FIG. 7. Additionally, the display field D1 for appreciation data is provided temporarily in a portion of the screen and in an area different from the area where the game video is displayed. In this case, a rating button B3 with the characters "GOOD" for inputting a good rating and a rating button B4 with the characters "BLOCK" for inputting a bad rating are provided below the display field D1. When a viewing user operates the rating button B3 for inputting a good rating, a good rating for the appreciation data being reproduced is counted. In other words, the distribution storage part 32 stores the cumulative number of good ratings in association with the data identification information of the appreciation data. Information about the rating may also be reported to a distributor who creates appreciation videos, for example, and may be used as reference information when creating further appreciation videos. Alternatively, after a rating is given by a viewing user, when this viewing user performs a user operation, the selection part 131 selects appreciation data to be distributed from among appreciation data for which the cumulative number of good ratings exceeds a prescribed number. With this arrangement, the selection part 131 causes the selection target to be different according to a good rating. Besides, the cumulative number of good ratings may be totaled for each viewing user or totaled for all viewing users. Also, the cumulative number of good ratings may be totaled for each distributor.

When a viewing user operates the rating button B4 for inputting a bad rating while appreciation data is being reproduced, information indicating a bad rating is transmitted together with the data identification information of the appreciation data and the user identification information of the viewing user to the distribution server 30. Additionally, the distribution storage part 32 creates and stores distribution-prohibited data (for example, a block list) in which the user identification information of the viewing user and the data identification information of the appreciation data are associated. After that, when the above viewing user performs a user operation, the selection part 131 references the distribution-prohibited data and excludes appreciation data included in the distribution-prohibited data from the selection target. With this arrangement, the selection part 131 can change the selection target according to a bad rating, and the viewing user can eliminate the distribution of appreciation data that the viewing user does not want to view. Alternatively, when a viewing user operates the rating button B4 for inputting a bad rating, a bad rating for the appreciation data being reproduced may be counted. In other words, the distribution storage part 32 stores the cumulative number of bad ratings in association with the data identification information of the appreciation data. Furthermore, the selection part 131 may exclude, from the selection target, appreciation data for which the cumulative number of bad ratings exceeds a prescribed number. With this arrangement, the selection part 131 change the selection target according to a bad rating. Besides, the cumulative number of bad ratings may be totaled for each viewing user or totaled for all viewing users.

According to the fourth embodiment described above, viewing users can be motivated to execute user operations with respect to appreciation data. Additionally, user operations and the distribution of appreciation data can be executed repeatedly. Moreover, when a viewing user wants to rate appreciation data, the viewing user can input a rating with respect to the appreciation data. Incidentally, as a modification of the fourth embodiment, the selection part 131 may also select single appreciation data preset for each user operation. In this case, appreciation data selected from among a plurality of pieces of appreciation data cannot be distributed. However, even in this case, viewing users can be motivated to execute user operations with respect to appreciation data, or input ratings for appreciation data.

Fifth Embodiment

Next, a fifth embodiment will be described. Incidentally, in the description of the fifth embodiment, the differences from the first to fourth embodiments will be described mainly, components already described will be denoted with the same reference signs, and a description of such components will be omitted. Except where specifically indicated otherwise, components denoted by the same reference signs exhibit substantially the same action and functions, and the effects of such components are also substantially the same.

In the fifth embodiment, the selection part 131 selects, as appreciation data with respect to a user operation, at least one piece of primary appreciation data from the appreciation data group RD that includes a plurality of pieces of primary appreciation data. Additionally, after the distribution of the primary appreciation data, the selection part 131 additionally selects secondary appreciation data as appreciation data to follow after the primary appreciation data with respect to a viewing user who satisfies a prescribed condition from among the viewing users to whom the primary appreciation data is distributed. With this arrangement, the distribution timing of the additional secondary appreciation data can be delayed, or special secondary appreciation data can be distributed to a desired viewing user. For example, when the appreciation data is few in number, the distribution of appreciation data can be postponed temporarily by distributing the additional secondary appreciation data at a later date. With this arrangement, the distributor and the like can be given extra time to create appreciation data. Also, special appreciation data that is out of the ordinary can be distributed to a viewing user who contributes a high-value reward or a viewing user who posts a large number of comments or good ratings described above. This arrangement makes it possible to give desired viewing users a sense of satisfaction that he or she is being treated preferentially.

As an example, the distribution storage part 32 stores the user identification information of a viewing user who satisfies a prescribed condition. The user identification information may be set by the distributor or the like, or may be set automatically by the distribution control part 31. For example, in the case where the distributor designates a viewing user and set so as to reproduce the primary appreciation data for the designated viewing user, the user identification information of the viewing user is stored in advance in the distribution storage part 32. Also, in the case where primary appreciation data has been distributed due to a lack of distributable appreciation data, the distribution control part 31 causes the distribution storage part 32 to store the user identification information of the viewing user to whom the primary appreciation data is distributed. The prescribed condition is being designated by the distributor or the like, that the value of a contributed reward exceeds a prescribed amount, that the number of posted comments or good ratings exceeds a prescribed number, or the like. Additionally, the selection part 131 references the user identification information stored by the distribution storage part 32, and when the user identification information of a viewing user who executes a user operation is included, the selection part 131 selects at least one piece of appreciation data from the appreciation data group RD consisted of primary appreciation data. The primary appreciation data includes audio or a character string with content suggesting a secondary appreciation, such as "I'll thank you properly on another day" or content giving special treatment to the viewing user, for example. At this time, the distribution storage part 32 stores the user identification information of the viewing user to whom the primary appreciation data has been distributed in association with input information (such as the content of a comment, for example) or operation identification information (for example, an identification ID that identifies a contribution amount, for example). With this arrangement, the distributor or the like can view the comment content, contributed reward amount, or the like later.

After that, the distributor or the like refers to the stored input information. In addition, the distributor or the like uploads secondary appreciation data or prepares a secondary distribution with previously uploaded appreciation data set as the secondary appreciation data, in association with the user identification information of each viewing user who satisfies the prescribed condition. The distribution storage part 32 then stores a record associating the user identification information with the data identification information of the secondary appreciation data. After that, at a prescribed timing, the selection part 131 selects the secondary appreciation data associated with the stored user identification information. Besides, when there is one piece of secondary appreciation data, the selection process may be omitted. For example, the prescribed timing is the time when the viewing user identified by the stored user identification information executes a user operation. Also, the prescribed timing may be any timing, such as when the distributor prepares a secondary distribution. The viewing user who satisfies the prescribed condition may be determined by the distribution control part 31, and the user identification information of the determined viewing user may also be stored in the distribution storage part 32. In this case, the distribution control part 31 may determine viewing users on respective levels according to a tiered condition, such as viewing users whose post counts satisfy a level of 5, a level of 10, or a level of 15, for example. Thereafter, the distribution control part 31 causes the distribution storage part 32 to store a record associating the user identification information of the viewing user who satisfies the prescribed condition with the data identification information of the secondary appreciation data.

In this way, the distribution storage part 32 stores the user identification information of the viewing user to whom the primary appreciation data is distributed in association with the data identification information of the secondary appreciation data to be distributed to the above viewing user. Thereafter, the selection part 131 selects the secondary appreciation data and the distribution part 132 distributes the secondary appreciation data to the reproduction terminal 20 of the viewing user to whom the primary appreciation data has been distributed. Besides, the selection of the secondary appreciation data and the distribution timing may also be decided automatically. However, the timing may not be in a situation in which the viewing user can view the appreciation data. For this reason, the distribution control part 31 may also transmit notification information to the viewing user before the secondary appreciation data is distributed. As an example, the notification information includes a notification for launching an application for viewing the secondary appreciation data, logging in to a prescribed website, or the like. Thereafter, when the viewing user receives the notification and performs a prescribed operation, the selection and distribution of the secondary appreciation data may be executed.

Besides, the selection part 131 may also select primary appreciation data in response to user operations by all viewing users, without distinguishing the viewing users who satisfy the prescribed condition. In this case, the distributor or the like uploads secondary appreciation data or prepares a secondary distribution with previously uploaded appreciation data set as the secondary appreciation data, in association with the respective user identification information of each of the viewing users who satisfy the prescribed condition. Thereafter, the distribution storage part 32 stores a record associating the user identification information of the viewing users who satisfy the prescribed condition with the data identification information of the secondary appreciation data. After that, at a prescribed timing, the selection part 131 selects the secondary appreciation data associated with the user identification information.

According to the fifth embodiment described above, the distribution timing of additional secondary appreciation data can be delayed, or special secondary appreciation data can be distributed to a desired viewing user. Incidentally, the selection part 131 may also select at least one piece of appreciation data from the appreciation data group RD that includes a plurality of pieces of secondary appreciation data. Besides, as a modification of the fifth embodiment, the selection part 131 may also select single primary appreciation data preset for each user operation. In this case, primary appreciation data selected from among a plurality of pieces of primary appreciation data cannot be distributed. However, even in this case, the distribution timing of the additional secondary appreciation data can be delayed, or special secondary appreciation data can be distributed to a desired viewing user.

The foregoing describes the present disclosure by referencing embodiments, but the present disclosure is not limited to the above embodiments. Modifications made within a scope that is not contrary to the present disclosure and equivalents of the present disclosure are also included in the present disclosure. Moreover, the embodiments and modifications may be combined, where appropriate, within a scope that is not contrary to the present disclosure. For example, the third or fourth embodiment may be combined with the fifth embodiment. Specifically, primary appreciation data may also be distributed in the case where no distributable appreciation data is available as result of executing the distribution of appreciation data selected by excluding appreciation data that satisfies an exclusion condition or the distribution of appreciation data resulting from a user operation with respect to appreciation data. With this arrangement, it is no longer necessary to prepare new appreciation data ahead of time, even in cases where there is not an ample amount of stocked appreciation data.

Also, at least a portion of the functional parts may be provided in any of the management server 10, the distribution server 30, the game server 60, and another external server. Functional parts provided in different servers cooperate to function as the distribution system 100. In this case, control program in each of the servers cooperate to function as a computer program of the distribution system 100.

Hereinafter, various aspects derived from the embodiments and modifications described above will be described. Besides, to make each aspect easier to understand, the reference signs indicated in the attached drawings are appended. However, the reference signs are not appended with the intention of limiting the present disclosure to the configurations illustrated in the drawings.

A distribution system 100 is a distribution system that distributes a viewing video to a user terminal 20 of each of a plurality of users who are viewers, the distribution system comprising: an operation reception unit 111 receiving a user operation inputted from each user terminal; a selection unit 131 selecting at least one piece of distribution data from a distribution data group RD including a plurality of pieces of distribution data in response to the user operation; and a data distribution unit 132 distributing the distribution data selected by the selection unit to at least the user terminal from which the user operation has been inputted.

A control method of the distribution system 100 is a control method of a distribution system that distributes a viewing video to a user terminal 20 of each of a plurality of users who are viewers, the control method comprising: receiving a user operation inputted from each user terminal; selecting at least one piece of distribution data from a distribution data group RD including a plurality of pieces of distribution data in response to the user operation; and distributing the selected distribution data to at least the user terminal from which the user operation has been inputted.

A computer program PG1, PG2 of the distribution system 100 is a computer program of a distribution system that has a computer 11, 31 and that distributes a viewing video to a user terminal 20 of each of a plurality of users who are viewers, the computer program causing the computer to function as: an operation reception unit 111 receiving a user operation inputted from each user terminal; a selection unit 131 selecting at least one piece of distribution data from a distribution data group RD including a plurality of pieces of distribution data in response to the user operation; and a data distribution unit 132 distributing the distribution data selected by the selection unit to at least the user terminal from which the user operation has been inputted.

A distribution system 100 is a distribution system that distributes a viewing video to a user terminal 20 of each of a plurality of users who are viewers, the distribution system comprising: a game device 70; a video distribution unit 132 generating the viewing video from a game video of a game provided by the game device and distributing the viewing video to each user terminal; an operation reception unit 111 receiving a user operation inputted from each user terminal; a selection unit 131 selecting at least one piece of distribution data from a distribution data group RD including a plurality of pieces of distribution data in response to the user operation; and a data distribution unit 132 distributing the distribution data selected by the selection unit to at least the user terminal from which the user operation has been inputted.

The selection unit 131 selects the distribution data randomly. Also, a rarity is set for each of the plurality of pieces of distribution data, and the selection unit 131 carries out a lottery in accordance with the rarity and selects the distribution data.

The distribution data group RD includes a plurality of sub-data groups each associated with a different attribute, the distribution system 100 further has an attribute acquisition unit 133 acquiring attribute-specifying information that specifies the attribute, and the selection unit 131 specifies the attribute on the basis of the attribute-specifying information, and selects the distribution data from the sub-data group associated with the specified attribute.

The attribute is classified on the basis of an operation attribute of the user operation, the attribute-specifying information indicates the operation attribute, and the selection unit 131 specifies the operation attribute on the basis of the attribute-specifying information, and selects the distribution data from the sub-data group associated with the specified operation attribute.

The operation reception unit 111 receives an inputting operation for a comment as the user operation, the attribute is classified on the basis of a comment attribute of the comment, and the selection unit 131 specifies the comment attribute on the basis of the attribute-specifying information, and selects the distribution data from the sub-data group associated with the specified comment attribute.

The attribute is classified on the basis of a user attribute of each user, the attribute-specifying information indicates the user attribute, and the selection unit 131 specifies the user attribute on the basis of the attribute-specifying information, and selects the distribution data from the sub-data group associated with the specified user attribute.

Incidentally, the selection unit 131 does not select the distribution data in the case where the attribute-specifying information indicates that the distribution data is not to be distributed.

The distribution system 100 further has an information acquisition unit 133 acquiring terminal identification information that identifies the user terminal 20 from which the user operation has been inputted, and the data distribution unit 132 distributes the distribution data to the user terminal specified on the basis of the terminal identification information.

The distribution system 100 further acquires a related video captured by an imaging device and distributes the related video to each user terminal 20.

The distribution data group RD includes a plurality of sub-data groups each associated with a different activity type, the distribution system 100 further has a history acquisition unit 133 acquiring an operation history of an inputting user who has inputted the user operation, and the selection unit 131 determines the activity type of the inputting user on the basis of the operation history, and selects the distribution data from the sub-data group associated with the activity type.

The operation reception unit 111 receives an inputting operation for a special command as the user operation, and the selection unit 131 selects the distribution data associated with the special command from the distribution data group RD.

The selection unit 131 specifies the distribution data not included in a selection target from the distribution data group RD, and selects the distribution data from among the remainder after the specified distribution data is excluded from the selection target.

What is claimed is:

1. A distribution system that distributes a viewing video to a user terminal of each of a plurality of users who are viewers, the distribution system comprising:
   a computer receiving a user operation inputted from each user terminal, wherein the user operation is inputted and received while the viewing video is being distributed;
   the computer selecting at least one piece of distribution data from a distribution data group including a plurality of pieces of distribution data in response to the user operation; and
   the computer distributing the distribution data selected by the computer to at least the user terminal from which the user operation has been inputted.

2. The distribution system according to claim 1, wherein the computer selects the distribution data randomly.

3. The distribution system according to claim 1, wherein a rarity is set for each of the plurality of pieces of distribution data, and
   the computer carries out a lottery in accordance with the rarity and selects the distribution data.

4. The distribution system according to claim 1, wherein the distribution data group includes a plurality of sub-data groups each associated with a different attribute,
   the distribution system further comprises an attribute acquisition unit acquiring attribute-specifying information that specifies the attribute, and
   the computer specifies the attribute on the basis of the attribute-specifying information, and selects the distribution data from the sub-data group associated with the specified attribute.

5. The distribution system according to claim 4, wherein the attribute is classified on the basis of an operation attribute of the user operation,
   the attribute-specifying information indicates the operation attribute, and
   the computer specifies the operation attribute on the basis of the attribute-specifying information, and selects the distribution data from the sub-data group associated with the specified operation attribute.

6. The distribution system according to claim 4, wherein the computer receives an inputting operation for a comment as the user operation,
   the attribute is classified on the basis of a comment attribute of the comment, and
   the computer specifies the comment attribute on the basis of the attribute-specifying information, and selects the distribution data from the sub-data group associated with the specified comment attribute.

7. The distribution system according to claim 4, wherein the attribute is classified on the basis of a user attribute of each user,
   the attribute-specifying information indicates the user attribute, and
   the computer specifies the user attribute on the basis of the attribute-specifying information, and selects the distribution data from the sub-data group associated with the specified user attribute.

8. The distribution system according to claim 4, wherein the computer does not select the distribution data in the case where the attribute-specifying information indicates that the distribution data is not to be distributed.

9. The distribution system according to claim 1, wherein the computer acquires terminal identification information that identifies the user terminal from which the user operation has been inputted, and
   the computer distributes the distribution data to the user terminal specified on the basis of the terminal identification information.

10. The distribution system according to claim 1, further acquiring a related video captured by an imaging device and distributing the related video to each user terminal.

11. The distribution system according to claim 1, wherein the distribution data group includes a plurality of sub-data groups each associated with a different activity type,
    the computer acquires an operation history of an inputting user who has inputted the user operation, and
    the computer determines the activity type of the inputting user on the basis of the operation history, and selects the distribution data from the sub-data group associated with the activity type.

12. The distribution system according to claim 1, wherein the computer receives an inputting operation for a special command as the user operation, and
    the computer selects the distribution data associated with the special command from the distribution data group.

13. The distribution system according to claim 1, wherein the computer specifies the distribution data not included in a selection target from the distribution data group, and selects the distribution data from among the remainder after the specified distribution data is excluded from the selection target.

14. A control method of a distribution system that distributes a viewing video to a user terminal of each of a plurality of users who are viewers, the control method comprising:
    receiving a user operation inputted from each user terminal, wherein the user operation is inputted and received while the viewing video is being distributed;
    selecting at least one piece of distribution data from a distribution data group including a plurality of pieces of distribution data in response to the user operation; and
    distributing the selected distribution data to at least the user terminal from which the user operation has been inputted.

15. A non-transitory computer-readable storage medium storing a computer program of a distribution system that has a computer and that distributes a viewing video to a user terminal of each of a plurality of users who are viewers, the computer program causing the computer to:
    receive a user operation inputted from each user terminal, wherein the user operation is inputted and received while the viewing video is being distributed;
    select at least one piece of distribution data from a distribution data group including a plurality of pieces of distribution data in response to the user operation; and
    distribute the distribution data selected by the computer to at least the user terminal from which the user operation has been inputted.

16. A distribution system that distributes a viewing video to a user terminal of each of a plurality of users who are viewers, the distribution system comprising:
    a game device;
    a computer generating the viewing video from a game video of a game provided by the game device and distributing the viewing video to each user terminal, wherein the user operation is inputted and received while the viewing video is being distributed;
    the computer receiving a user operation inputted from each user terminal;

the computer selecting at least one piece of distribution data from a distribution data group including a plurality of pieces of distribution data in response to the user operation; and the computer distributing the distribution data selected by the computer to at least the user terminal from which the user operation has been inputted.

17. The distribution system according to claim 1, wherein the computer distributes the distribution data to the at least the user terminal from which the user operation has been inputted while the viewing video is being distributed.

18. The control method according to claim 14, wherein the distribution data is distributed to the at least the user terminal from which the user operation has been inputted while the viewing video is being distributed.

19. The non-transitory computer-readable storage medium according to claim 15, wherein the computer program causing the computer to distribute the distribution data to the at least the user terminal from which the user operation has been inputted while the viewing video is being distributed.

20. The distribution system according to claim 16, wherein the computer distributes the distribution data to the at least the user terminal from which the user operation has been inputted while the viewing video is being distributed.

* * * * *